US012451619B2

(12) United States Patent
Huang et al.

(10) Patent No.: US 12,451,619 B2
(45) Date of Patent: Oct. 21, 2025

(54) BROADBAND MILLIMETER WAVE CIRCULARLY POLARIZED ANTENNA ELEMENT, SINGLE-MODE ARRAY AND DUAL-MODE ARRAY

(71) Applicant: Anhui University, Hefei (CN)

(72) Inventors: Zhixiang Huang, Hefei (CN); Chao Wang, Hefei (CN); Minquan Li, Hefei (CN); Guanghui Xu, Hefei (CN); Guoda Xie, Hefei (CN); Kaikun Niu, Hefei (CN); Xingang Ren, Hefei (CN)

(73) Assignee: ANHUI UNIVERSITY, Anhui (CN)

( * ) Notice: Subject to any disclaimer, the term of this patent is extended or adjusted under 35 U.S.C. 154(b) by 189 days.

(21) Appl. No.: 18/211,942

(22) Filed: Jun. 20, 2023

(65) Prior Publication Data

US 2024/0305014 A1 Sep. 12, 2024

(30) Foreign Application Priority Data

Mar. 6, 2023 (CN) ......................... 202310200743.2

(51) Int. Cl.
*H01Q 21/24* (2006.01)
*H01Q 9/28* (2006.01)

(52) U.S. Cl.
CPC ............. *H01Q 21/24* (2013.01); *H01Q 9/285* (2013.01)

(58) Field of Classification Search
CPC .... H01Q 13/106; H01Q 21/065; H01Q 21/24; H01Q 7/00; H01Q 9/0414; H01Q 9/0428; H01Q 9/285; Y02D 30/70
See application file for complete search history.

(56) References Cited

U.S. PATENT DOCUMENTS

| | | | | |
|---|---|---|---|---|
| 7,589,676 | B2 * | 9/2009 | Popugaev | H01Q 9/0414 343/700 MS |
| 10,813,210 | B2 * | 10/2020 | Azadzoi | H05K 1/0218 |
| 11,688,924 | B2 * | 6/2023 | Jung | H01Q 1/1271 343/713 |
| 11,929,564 | B2 * | 3/2024 | Woo | H01Q 1/526 |

(Continued)

OTHER PUBLICATIONS

Wideband Circularly Polarized Microstrip Slot Antenna with Parasitic Ground Planes, Qin Huang (Year: 2022).*

*Primary Examiner* — Thien M Le
(74) *Attorney, Agent, or Firm* — Ming Jiang; OPENPTO US LLC

(57) ABSTRACT

Disclosed are a broadband millimeter-wave circularly polarized antenna element, a single-mode array, and a dual-mode array, relating to the technical field of circularly polarized antennas. A microstrip feeder is arranged on a lower surface of a second dielectric substrate of the antenna element. A coupling slot is etched on a metal ground layer, two metallized vias are formed on a first dielectric substrate, and a metal strip is tiled on an upper surface of the first dielectric substrate. Two L-shaped parasitic patches are also tiled on the first dielectric substrate. The two L-shaped parasitic patches are located on both sides of the metal strip, and the two L-shaped parasitic patches are rotationally symmetric about a center point of the upper surface of the first dielectric substrate. According to the present disclosure, a 3-dB axial ratio bandwidth of the antenna element is improved by using L-shaped parasitic patches.

9 Claims, 21 Drawing Sheets

(56) References Cited

U.S. PATENT DOCUMENTS

| | | | | |
|---|---|---|---|---|
| 2007/0296634 | A1* | 12/2007 | Popugaev | H01Q 9/0428<br>343/700 MS |
| 2011/0032154 | A1* | 2/2011 | Chung | H01Q 9/0414<br>343/700 MS |
| 2014/0091979 | A1* | 4/2014 | Fakharzadeh | H01Q 1/36<br>343/895 |
| 2015/0171520 | A1* | 6/2015 | Parsche | H01Q 9/0471<br>343/795 |
| 2018/0083360 | A1* | 3/2018 | Tonn | H01Q 19/06 |
| 2020/0388912 | A1* | 12/2020 | Sudo | H01Q 1/2283 |
| 2022/0344823 | A1* | 10/2022 | Panther | H01Q 21/26 |

* cited by examiner

BROADBAND MILLIMETER WAVE CIRCULARLY POLARIZED ANTENNA ELEMENT, SINGLE-MODE ARRAY AND DUAL-MODE ARRAY

CROSS-REFERENCE TO RELATED APPLICATION

This patent application claims the benefit and priority of Chinese Patent Application No. 2023102007432, filed with the China National Intellectual Property Administration on Mar. 6, 2023, the disclosure of which is incorporated by reference herein in its entirety as part of the present application.

TECHNICAL FIELD

The present disclosure relates to the technical field of circularly polarized antennas, in particular to a broadband millimeter wave circularly polarized antenna element, a single-mode array, and a dual-mode array.

BACKGROUND

With the rapid development of the fifth generation (5G) mobile communication, millimeter wave band has been widely recommended to provide high data transmission rate and wide spectrum resources. Compared with linearly polarized antenna which can only receive the same linearly polarized waves, circularly polarized (CP) antenna can receive any linearly polarized waves and circularly polarized waves, thus avoiding polarization loss caused by polarization mismatch between transmitting and receiving antennas. Circularly polarized antenna has excellent performance in solving polarization mismatch, suppressing rain and fog interference and eliminating Faraday effect, and thus attracts a lot of attention.

In order to improve the transmission distance of millimeter wave antennas, antenna arrays are required. Sequential-rotated feed network is widely used due to its advantage of further improving axial ratio bandwidth of circularly polarized antenna arrays. Although the axial ratio bandwidth of the array can be further increased based on the sequential-rotated feed network, the enhancement of 3-dB axial ratio bandwidth is often less than 20%. This is mainly because the current 3-dB axial ratio bandwidth of antenna arrays based on sequential-rotated feed networks cannot always increase with the increase of array size. That is to say, the 3-dB axial ratio bandwidth can be significantly improved when the antenna element is extended to 2×2 antenna subarray. However, when the 2×2 antenna subarray is extended to 4×4 or 8×8 antenna arrays, the 3-dB axial ratio bandwidth is hardly improved. Therefore, the 3-dB axial ratio bandwidth of most millimeter wave circularly polarized antenna arrays based on sequential-rotated feed networks is still relatively narrow.

SUMMARY

An objective of the present disclosure is to provide a broadband millimeter wave circularly polarized antenna element, a single-mode array, and dual-mode array, through which 3-dB axial ratio bandwidth can be greatly improved.

In order to achieve the above objective, the present disclosure provides the following solution:

In a first aspect, a broadband millimeter wave circularly polarized antenna element is provided, which includes a first dielectric substrate, a second dielectric substrate, and a metal ground layer located between the first dielectric substrate and the second dielectric substrate.

A microstrip feeder is arranged on a lower surface of the second dielectric substrate. A coupling slot is etched on the metal ground layer. Two metallized vias are provided on the first dielectric substrate, and a metal strip is tiled on an upper surface of the first dielectric substrate. The two metallized vias are located at outer edges of both sides of the coupling slot and are in contact with the coupling slot. One end of the metal strip is in contact with one of the metallized vias, the other end of the metal strip is in contact with another metallized via, thus making the coupling slot equivalent to one magnetic dipole, and the two metallized vias and the metal strip equivalent to another magnetic dipole as a whole.

Two L-shaped parasitic patches are tiled on the first dielectric substrate, and the two L-shaped parasitic patches are located on both sides of the metal strip and are rotationally symmetrical about a center point of the upper surface of the first dielectric substrate.

In a second aspect, a single-mode array provided by the present disclosure is a 2×2 antenna subarray. The 2×2 antenna subarray includes a first sequential-rotated split ring structure, a first main feeder, and four antenna elements arranged in a sequentially rotating manner. The antenna elements each are a broadband millimeter wave circularly polarized antenna element in the first aspect.

Rotation directions of the four antenna elements are the same as a rotation direction of a single-mode sequential-rotated feed network. The single-mode sequential-rotated feed network is a feed network consisting of microstrip feeders of the four antenna elements, the first sequential-rotated split ring structure, and the first main feeder. The first sequential-rotated split ring structure is respectively connected to one end of the microstrip feeder of each of the four antenna elements and one end of the first main feeder.

In a third aspect, a dual-mode array provided by the present disclosure is a 4×4 antenna array. The 4×4 antenna array includes a second sequential-rotated split ring structure, a second main feeder, and four single-mode arrays in the second aspect arranged in a sequentially rotating manner.

Rotation directions of the four single-mode arrays are the same as a rotation direction of a dual-mode sequential-rotated feed network. The dual-mode sequential-rotated feed network is a feed network consisting of four single-mode sequential-rotated feed networks, the second sequential-rotated split ring structure, and the second main feeder. The second sequential-rotated split ring structure is respectively connected to one end of the second main feeder and the other end of the first main feeder of each of the four single-mode sequential-rotated feed networks.

A diameter of the first sequential-rotated split ring structure in the single-mode array is different from that of the second sequential-rotated split ring structure.

According to specific embodiment provided by the present disclosure, the present disclosure discloses the following technical effects:

According to the present disclosure, the 3-dB axial ratio bandwidth of an antenna element is improved by using L-shaped parasitic patches.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

To make the objectives, features and advantages of the present disclosure more apparently and understandably, the following further describes the present disclosure in detail with reference to the accompanying drawings and the specific embodiments.

Embodiment 1

Figure 1:
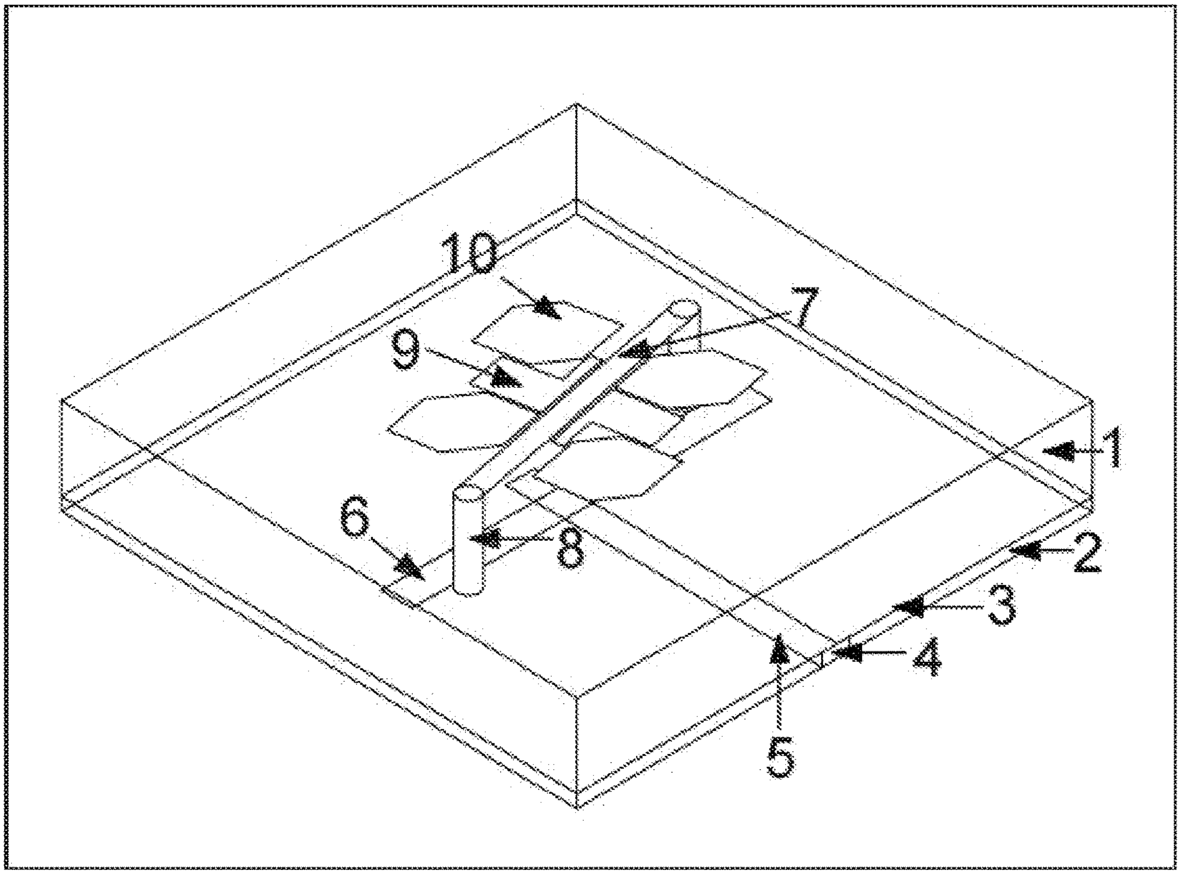
FIG. 1 is a structure schematic diagram of a broadband millimeter-wave circularly polarized antenna element according to the present disclosure.

It is provided a broadband millimeter wave circularly polarized antenna element (hereinafter referred to as an antenna element) according to this embodiment. As shown in FIG. 1, the positions of various structures of the antenna element and the relationship between the structures can be observed.

The antenna element includes a first dielectric substrate 1, a second dielectric substrate 2, and a metal ground layer 3 located between the first dielectric substrate 1 and the second dielectric substrate 2. A microstrip feeder 5 is arranged on a lower surface of the second dielectric substrate 2, i.e., one end of the microstrip feeder 5 is a microstrip feed port 4, and the other end of the microstrip feeder 5 extends to the lower surface of the second dielectric substrate 2. A coupling slot 6 is etched on the metal ground layer 3, two metallized vias 8 are provided on the first dielectric substrate 1, and a metal strip 7 is tiled on an upper surface of the first dielectric substrate 1. The two metallized vias 8 are located on outer edges of both sides of the coupling slot 6 and are in contact with the coupling slot 6, one end of the metal strip 7 is in contact with one of the metallized vias, the other end of the metal strip 7 is in contact with another metallized via, thus making the coupling slot equivalent to a magnetic dipole, and the two metallized vias and the metal strip 7 equivalent to another magnetic dipole as a whole.

Two L-shaped parasitic patches 9 are tiled on the first dielectric substrate 1. The two L-shaped parasitic patches 9 are located on both sides of the metal strip 7 and are rotationally symmetrical about a center point of an upper surface of the first dielectric substrate 1. The two L-shaped parasitic patches 9 are coupled to the metal strip 7 to produce another new CP resonance point, which improves 3-dB axial ratio bandwidth.

Preferably, in this embodiment, four hexagonal parasitic patches 10 are tiled on the first dielectric substrate 1. The four hexagonal parasitic patches 10 are located on both sides of the metal strip 7, and the four hexagonal parasitic patches 10 are rotationally symmetrical about the center point of the upper surface of the first dielectric substrate 1. Such an arrangement can further improve the 3-dB axial ratio bandwidth and a radiation gain.

Further, a first hexagonal parasitic patch, a first L-shaped parasitic patch and a second hexagonal parasitic patch are tiled in sequence on one outer side of the metal strip 7, and a third hexagonal parasitic patch, a second L-shaped parasitic patch and a fourth hexagonal parasitic patch are tiled in sequence on another outer side of the metal strip 7. The metal ground layer 3, the metal strip 7, the L-shaped parasitic patches and the hexagonal parasitic patches 10 are all made of copper.

Preferably, in this embodiment, the metal strip 7 is a main radiation structure of the antenna element. The coupling slot 6 is formed by etching in a middle area of the metal ground layer 3, thus making the coupling slot 6 located in the middle of the metal ground layer 3, it is equivalent to a slot cut away in the middle of the metal ground layer 3. The coupling slot 6 has the following functions: firstly, energy of the microstrip feeder 4 is excited by the coupling slot 6 to generate radiation from the radiation structure of the antenna element; secondly, the coupling slot 6 is equivalent to a magnetic dipole M1.

Further, in this embodiment, the metallized vias 8 are located in the first dielectric substrate 1, each having a height of 1.575 mm and a radius of 0.2 mm. The metallized vias 8 are in contact with the metal strip 7 and a surface of the metal ground layer 3. Meanwhile, the two metallized vias are just in contact with edges of both sides of a narrow side of the coupling slot 6, respectively, i.e., one of the metallized vias is located at an outer edge of a long side of the coupling slot to make contact with a long side of the coupling slot, and is close to a wide side of the coupling slot; another metallized via is located at an outer edge of the other long side of the coupling slot to make contact with the other long side of the coupling slot, and is close to another wide side of the coupling slot. An entirety formed by the two metallized vias 8 next to the coupling slot 6 and the metal strip 7 located on the upper surface of the first dielectric substrate 1 may be equivalent to a classical loop, which is equivalent to another magnetic dipole M2 and forms a pair of magnetic dipoles with the coupling slot 6.

Figure 2:
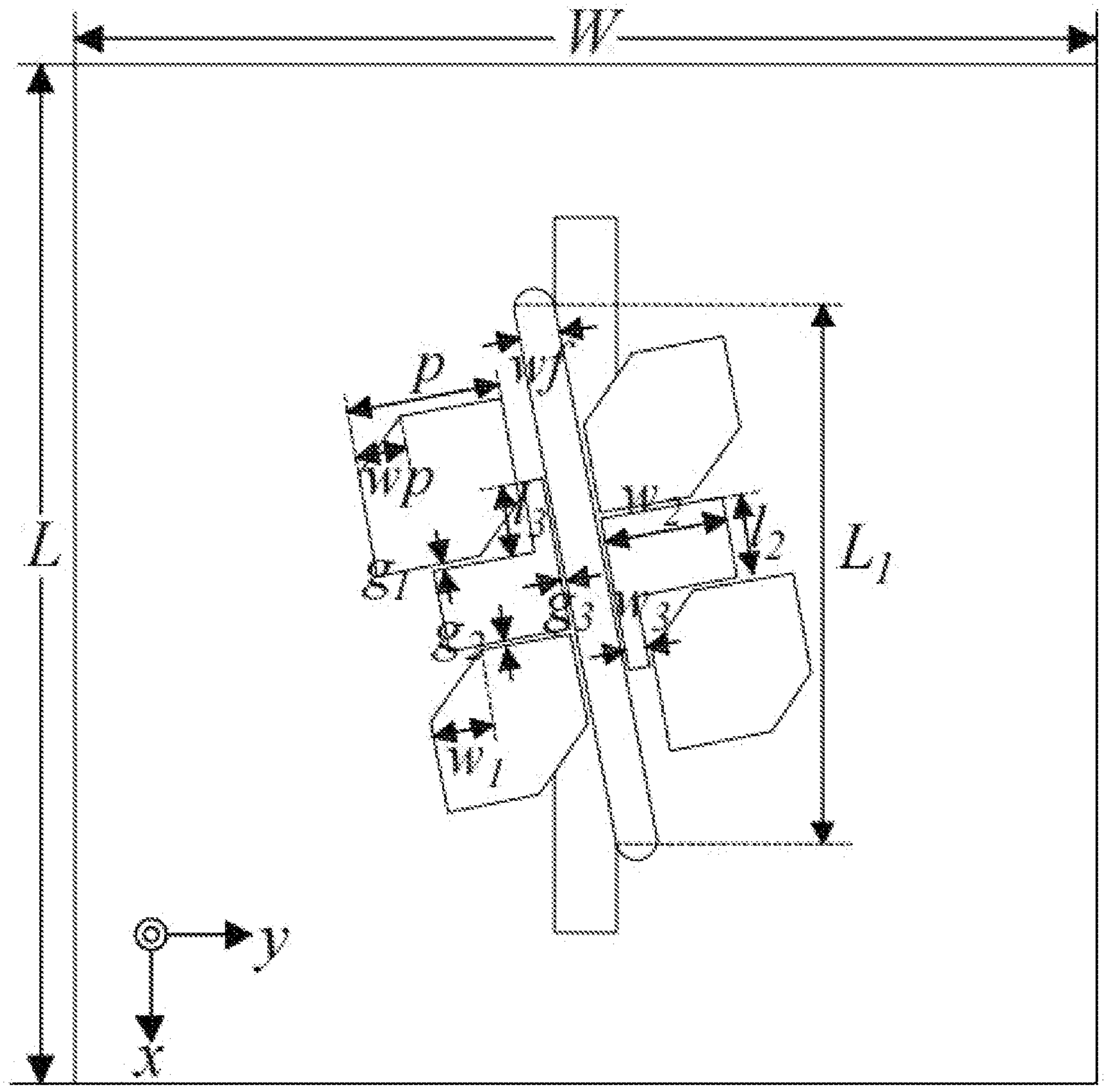
FIG. 2 is a structural parameter diagram of a first dielectric substrate and various devices on an upper surface of the first dielectric substrate according to the present disclosure.

As shown in FIG. 2, the first dielectric substrate employs a Rogers 5880 dielectric substrate, which has a thickness of 1.575 mm, a width W of 10 mm, a length L of 10 mm, and a dielectric constant of 2.2. A loss tangent tan $\delta$ of the first dielectric substrate is equal to 0.0009.

A length L1 of the metal strip in an x-axis direction is equal to 5.2 mm, and a width wf of the metal strip is equal to 0.4 mm. A distance g3 between the metal strip and the L-shaped parasitic patch in a y-axis direction is equal to 0.05 mm. Structural parameters of the L-shaped parasitic patch are that l2 is equal to 0.8 mm, l3 is equal to 0.7 mm, $w_2$ is equal to 1.2 mm, and $w_3$ is equal to 0.2 mm. Structural parameters of the hexagonal parasitic patch are that $w_1$ is equal to 0.6 mm, wp is equal to 0.5 mm, and p is equal to 1.5 mm. On one outer side of the same metal strip, a distance g2 between the L-shaped parasitic patch and a hexagonal parasitic patch is equal to 0.05 mm, a distance g2 between the L-shaped parasitic patch and another hexagonal parasitic patch is equal to 0.05 mm.

Figure 3:
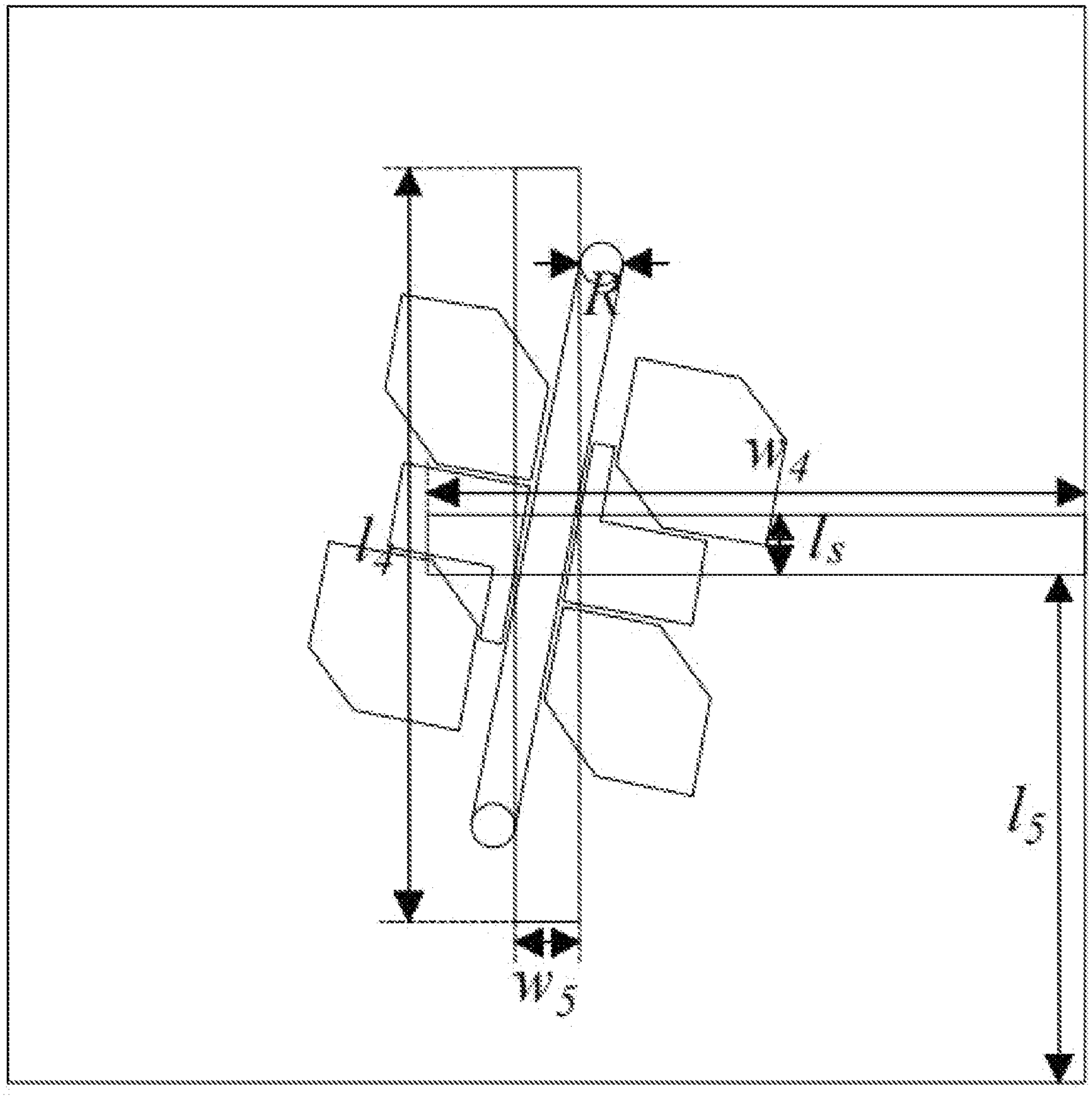
FIG. 3 is a structural parameter diagram of a coupling slot and a microstrip feeder according to the present disclosure.

As shown in FIG. 3, the microstrip feeder has a length $w_4$ equal to 6.1 mm, and a width ls of 0.55 mm. A distance l5 between the microstrip feeder and the second dielectric substrate is equal to 4.725 mm. The coupling slot has a width $w_5$ of 0.6 mm and a length l4 of 7.0 mm. A diameter R of the metallized via is equal to 0.4 mm.

The second dielectric substrate 2 employs a Rogers 5880 dielectric substrate, which has a thickness of 0.254 mm, a width of 10 mm, a length of 10 mm, and a dielectric constant of 2.2. A loss tangent tan $\delta$ of the second dielectric substrate 2 is equal to 0.0009.

Figure 4:
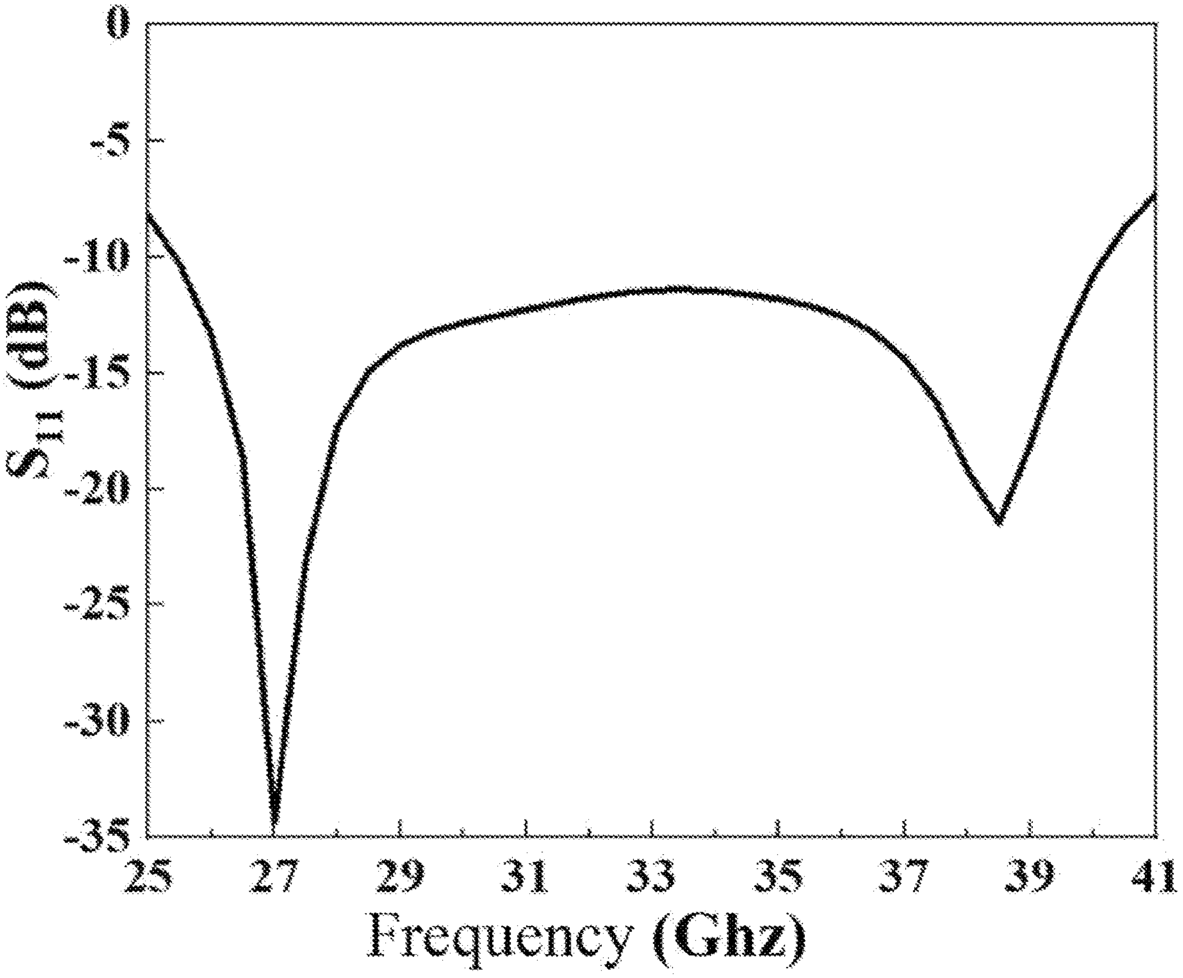
FIG. 4 is a diagram illustrating S11 simulation results of an antenna element according to the present disclosure.

FIG. 4 is a diagram illustrating S11 simulation results of an antenna element. As shown in FIG. 4, the simulation results show that the −10 dB S11 bandwidth of the antenna element is from 25.4 GHz to 40.2 GHz (relative bandwidth is 45.1%).

Figure 5:
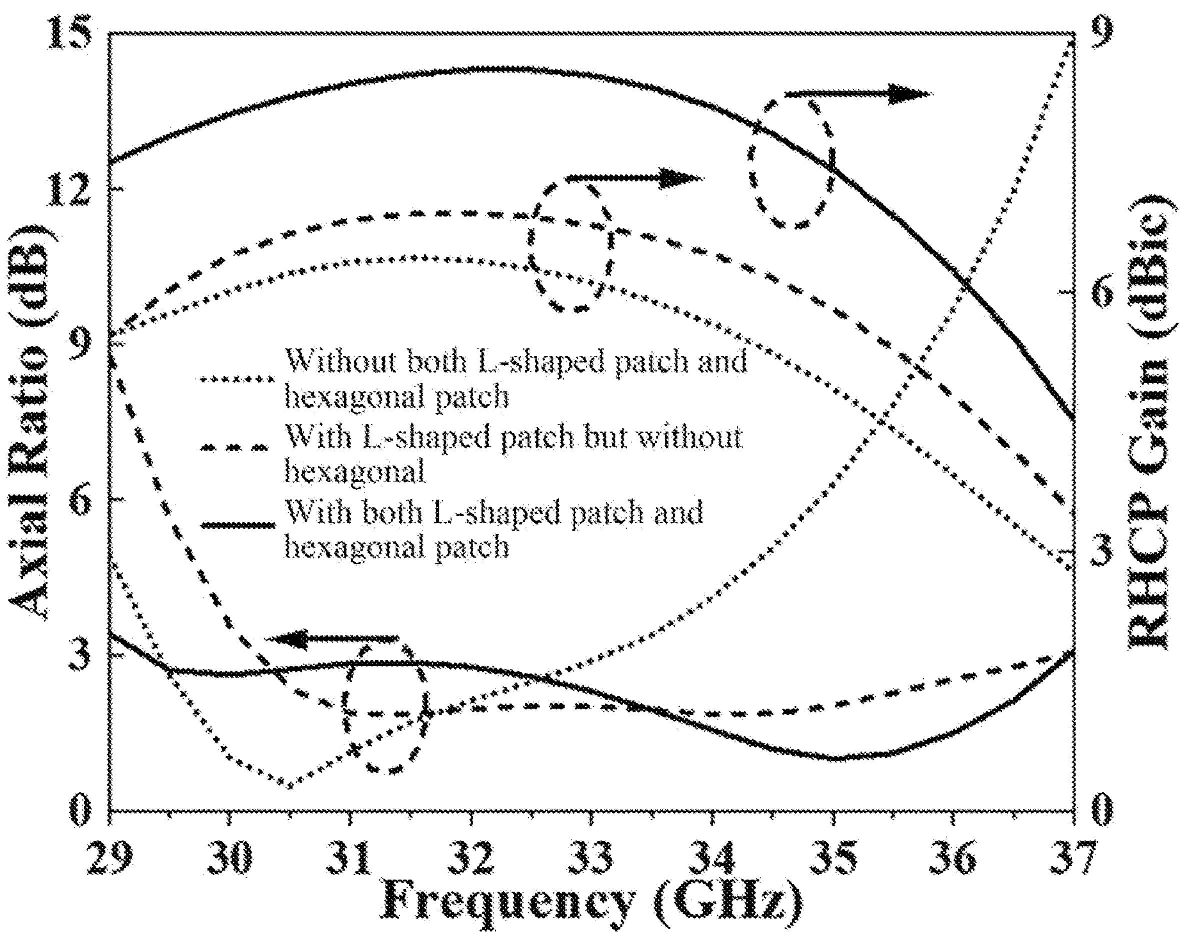
FIG. 5 is a comparison diagram of axial ratio and gain simulation results of an antenna element according to the present disclosure with or without an L-shaped parasitic patch and a hexagonal parasitic patch.

FIG. 5 is a comparison diagram of axial ratio and gain simulation results of an antenna element with or without the L-shaped parasitic patch and the hexagonal parasitic patch. As shown in FIG. 5, the results show that the antenna element has the widest axial-ratio bandwidth and the highest gain when there are both the L-shaped parasitic patch and the hexagonal parasitic patch. Specifically, when there are both L-shaped parasitic patch and hexagonal parasitic patch, the 3-dB axial ratio bandwidth of the antenna element can cover the frequency band from 29.3 GHz to 37.0 GHz (relative bandwidth is 23.2%). Axial ratio is an index to measure whether an antenna can radiate circularly polarized waves. It is generally considered that the antenna radiates circularly polarized waves when its axial ratio is lower than 3-dB at a certain frequency. 1-dB right-handed CP gain bandwidth is about 29.1 GHz to 34.9 GHz (relative bandwidth is 18.1%), and a peak right-handed CP gain is about 8.6 dBic.

Figure 6:
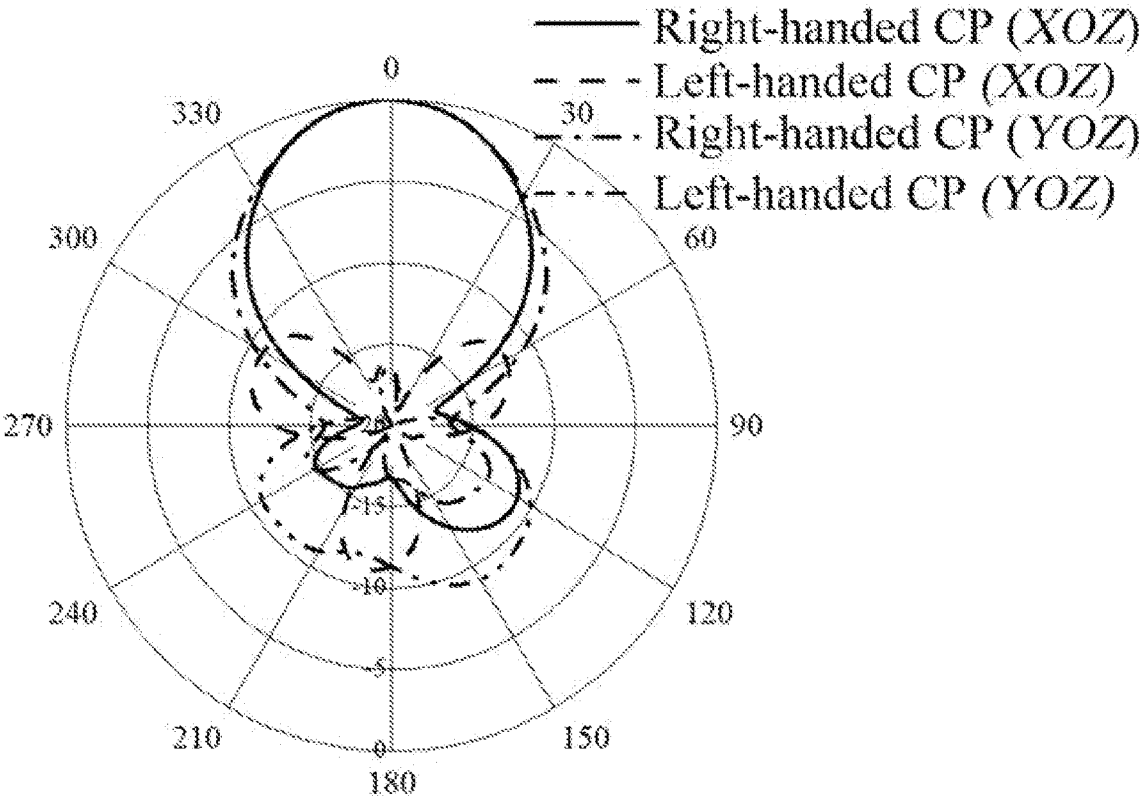
FIG. 6 is a normalized radiation pattern of an antenna element according to the present disclosure at a frequency point of 30 GHz.

FIG. 6 is a normalized radiation pattern of an antenna element at a frequency point of 30 GHz. As can be seen from FIG. 6 that the antenna radiates right-handed circularly polarized waves in a +z direction and shows significant unidirectional radiation characteristics. The left-handed circularly polarized wave is small relative to the right-handed circularly polarized wave.

Figure 7:
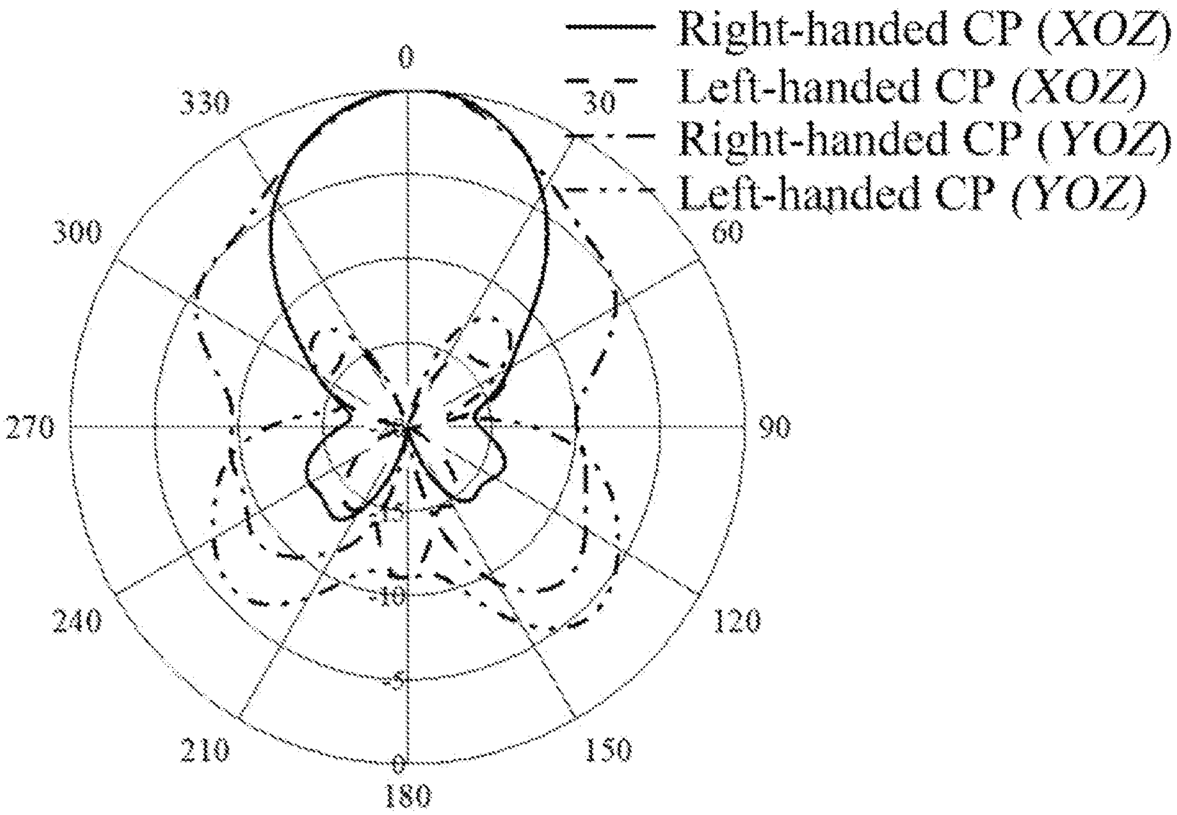
FIG. 7 is a normalized radiation pattern of an antenna element according to the present disclosure at a frequency point of 35 GHz.

FIG. 7 is a normalized radiation pattern of an antenna element at a frequency point of 35 GHz. As can be seen from FIG. 7 that the antenna radiates right-handed circularly polarized waves in a +z direction and shows significant unidirectional radiation characteristics. The left-handed circularly polarized wave is small relative to the right-handed circularly polarized wave.

The antenna element provided by this embodiment has the following advantages:

(1) Circularly Polarized (CP) Radiation

In order to generate CP radiation, two orthogonal electric field components accompanied with the same amplitude and a 90-degree phase difference are needed. As shown in FIG. 1, a metal strip 7 is located on an upper surface of a first dielectric substrate 1, which is a radiation structure of an antenna and is excited by a coupling slot 6 etched on a metal ground layer 3. The coupling slot 6 may be equivalent to a magnetic dipole (M1), which can produce a horizontal electric field component. An entirety formed by two metallized vias 8 and the metal strip 7 may be equivalent to a classical loop, which is equivalent to another magnetic dipole (M2), and can produce a vertical electric field component. M1 and M2 are orthogonal to each other to form a pair of orthogonal magnetic dipoles (OMD for short), which can generate orthogonal electric fields. As a thickness of the first dielectric substrate is 1.575 mm and is about ¼ $\lambda g$ of the center frequency ($\lambda g$ is a wavelength in the dielectric), and the 90-degree phase difference is provided, and thus the CP radiation can be generated.

(2) Increased Axial Ratio Bandwidth

First, rotationally symmetric L-shaped parasitic patches 9 are added on both sides of the metal strip 7. Due to the coupling between the L-shaped parasitic patches 9 and the metal strip 7, a new CP resonance point can be generated. As shown in FIG. 5, the 3-dB axial ratio bandwidth of the antenna element can be widened. In order to further obtain wider 3-dB axial ratio bandwidth while obtaining a higher gain, the surface current distribution is changed as four hexagonal parasitic patches 10 are arranged around the metal strip 7, and the 3-dB axial ratio bandwidth of the antenna element is widened due to the parasitic effect. As shown in FIG. 5, when there is no L-shaped parasitic patch nor hexagonal parasitic patch, the 3-dB axial ratio bandwidth is 11.2% (29.5-33.0 GHz), and a peak right-handed CP gain is 6.4 dBic. After the axial ratio bandwidth is increased, i.e., with both L-shaped parasitic patch and hexagonal parasitic patch, the 3-dB axial ratio bandwidth of the antenna element can reach 23.2% (29.3 GHz to 37.0 GHz), and the peak right-handed CP gain is about 8.6 dBic. Compared with an original state of the antenna element (no L-shaped parasitic patch nor hexagonal parasitic patch), the 3-dB axis specific bandwidth of the antenna element provided in this embodiment is increased by 12.0%, and the peak right-handed CP gain is increased by about 2.2 dBic.

Embodiment 2

Figure 8:
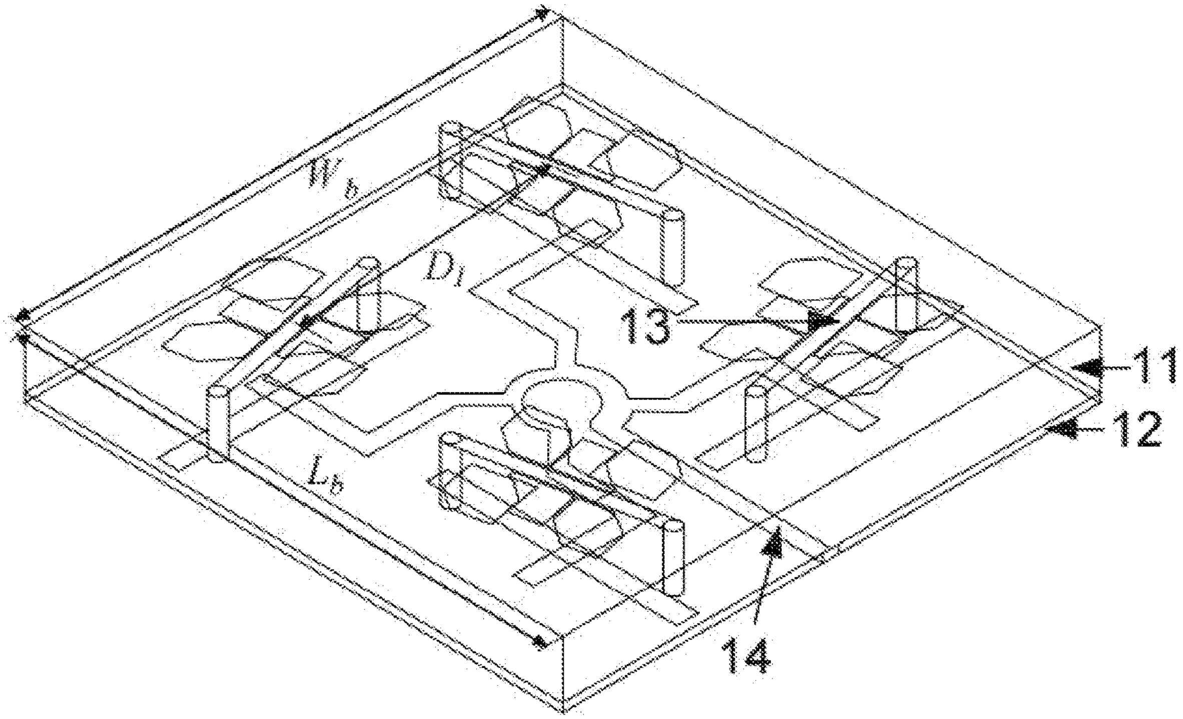
FIG. 8 is a structure schematic diagram of a 2×2 antenna subarray according to the present disclosure.

As shown in FIG. 8, a single-mode array provided by this embodiment is a 2×2 antenna subarray. The 2×2 antenna subarray mainly includes four antenna elements 13, and the positions of various structures in the 2×2 antenna subarray and the relationship between the structures can be observed.

The 2×2 antenna subarray includes a first sequential-rotated split ring structure, a first main feeder, and four antenna elements 13 arranged in a sequentially rotating manner. The antenna elements 13 each are a broadband millimeter wave circularly polarized antenna element of Embodiment 1. Rotation directions of the four antenna elements 13 are the same as a rotation direction of a single-mode sequential-rotated feed network 14. The single-mode sequential-rotated feed network 14 is a feed network consisting of microstrip feeders of the four antenna elements 13, the first sequential-rotated split ring structure, and the first main feeder. The first sequential-rotated split ring structure is respectively connected to one end of the microstrip feeder of each of the four antenna elements 13 and one end of the first main feeder.

In this embodiment, the four antenna elements 13 share a same dielectric substrate, specifically, the first dielectric substrates of the four antenna elements 13 are a third dielectric substrate 11, and the second dielectric substrates of the four antenna elements 13 are a fourth dielectric substrate 12. The other end of each microstrip feeder extends to a lower surface of the second dielectric substrate of the antenna element, and the other end of the first main feeder is a microstrip feed port.

In this embodiment, the third dielectric substrate 11 is close to the fourth dielectric substrate 12. The third dielectric substrate 11 employs a Rogers 5880 dielectric substrate with a thickness of 1.575 mm, a width Wb of 15 mm, a length Lb of 15 mm, and a dielectric constant of 2.2. A loss tangent tan δ of the third dielectric substrate 11 is equal to 0.0009. The fourth dielectric substrate 12 employs a Rogers 5880 dielectric substrate with a thickness of 0.254 mm, a width of 15 mm, a length of 15 mm, and a dielectric constant of 2.2. A loss tangent tan δ of the fourth dielectric substrate 12 is equal to 0.0009. In two adjacent antenna elements 13, a distance D1 between a center point of a metal strip in one antenna element and a center point of a metal strip in another antenna element is equal to 7.5 mm.

Figure 9:
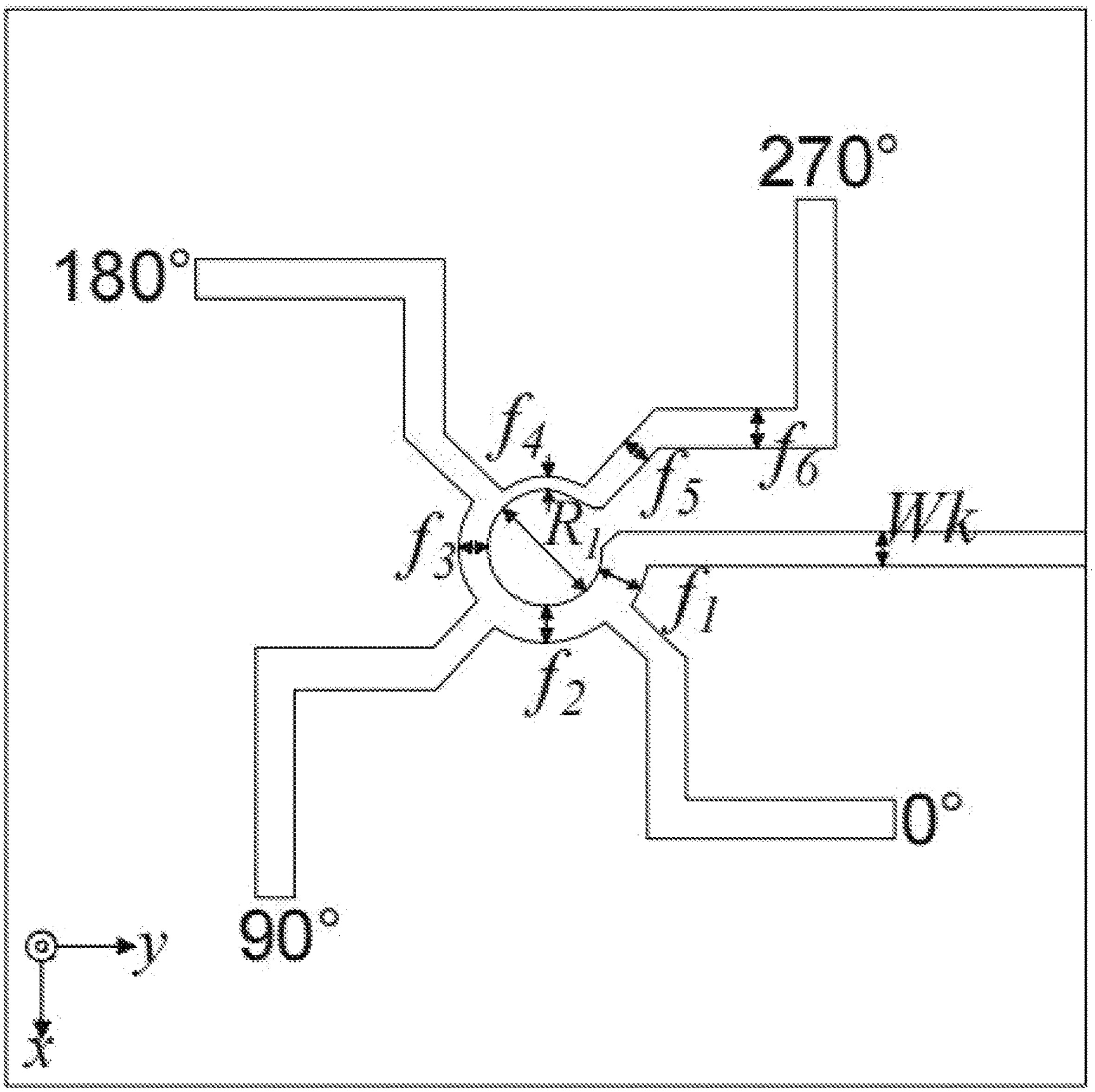
FIG. 9 is a structural diagram of a single-mode sequential-rotated feed network according to the present disclosure.

The single-mode sequential-rotated feed network rotates clockwise to produce 0-degree, 90-degree, 180-degree and 270-degree phases at four output ports, respectively, in which a phase difference between adjacent output ports is 90 degrees and the electric fields are orthogonal to each other. Therefore, circularly polarized radiation can be generated, and the circular polarization bandwidth of the subarray can be enhanced. As shown in FIG. 9, a diameter R1 of the first sequential-rotated split ring structure is equal to 1.6 mm. The first sequential-rotated split ring structure is divided into a first arc segment, a second arc segment, a third arc segment and a fourth arc segment clockwise. A distance f1 between an inner ring and an outer ring of the first arc segment is equal to 0.63 mm, a distance f2 between an inner ring and an outer ring of the second arc segment is equal to 0.52 mm, a distance f3 between an inner ring and an outer ring of the third arc segment is equal to 0.4 mm, and a distance f4 between an inner ring and an outer ring of the fourth arc segment is equal to 0.2 mm. The microstrip feeder includes a straight line microstrip feeder and a meander line microstrip feeder, and a width Wk of the straight line microstrip feeder is equal to 0.46 mm. The meander line microstrip feeder includes a first meander line microstrip feeder and a second microstrip feeder connected to the first microstrip feeder. A width f5 of the first microstrip feeder is equal 0.46 mm, and a width f6 of second microstrip feeder is equal to 0.55 mm.

Figure 10:
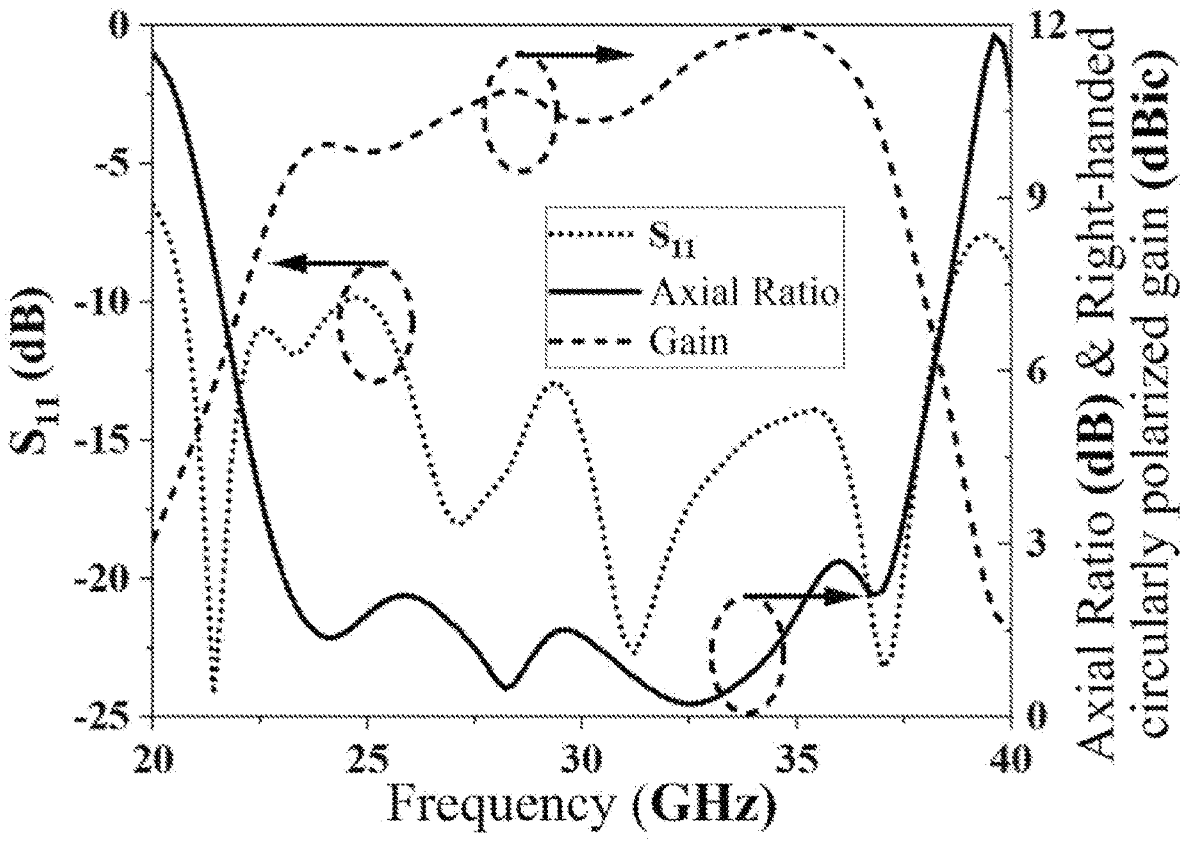
FIG. 10 is a diagram illustrating simulated S11, axial ratio and gain results of a 2×2 antenna subarray according to the present disclosure.

FIG. 10 is a diagram illustrating simulated S11, axial ratio and gain results of a 2×2 antenna subarray. As can be seen from FIG. 10, the −10 dB S11 bandwidth of the 2×2 antenna subarray is 60.3% (from 20.6 GHz to 38.4 GHz), the 3 dB-axial ratio bandwidth is 48.3% (from 22.8 GHz to 37.3 GHz), and the peak right-handed gain is 12.0 dBic. Compared with the antenna element, the 3 dB-axial ratio bandwidth is increased by 25.1%.

Figure 11:
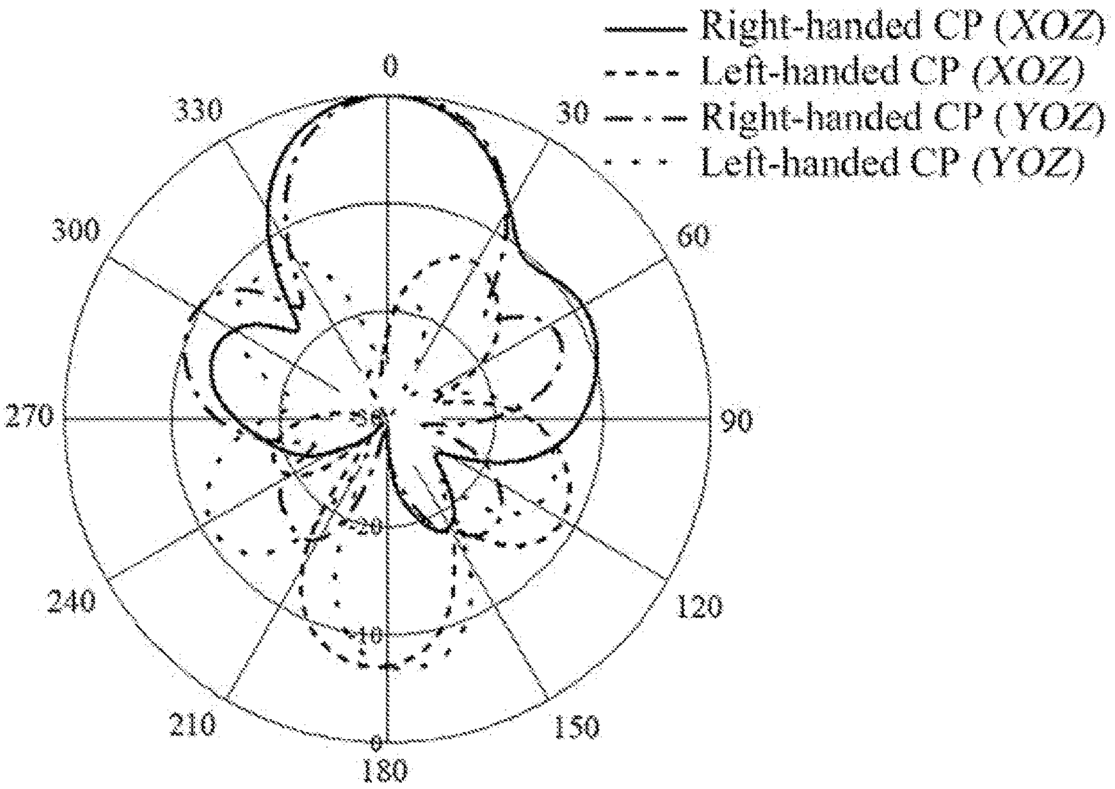
FIG. 11 is a normalized radiation pattern of a 2×2 antenna subarray according to the present disclosure at a frequency point of 24 GHz.

FIG. 11 is a normalized radiation pattern of a 2×2 antenna subarray at a frequency point of 24 GHz. As can be seen from FIG. 11 that the antenna radiates right-handed circularly polarized waves in a +z direction and shows significant unidirectional radiation characteristics. The left-handed circularly polarized wave is small relative to the right-handed circularly polarized wave.

Figure 12:
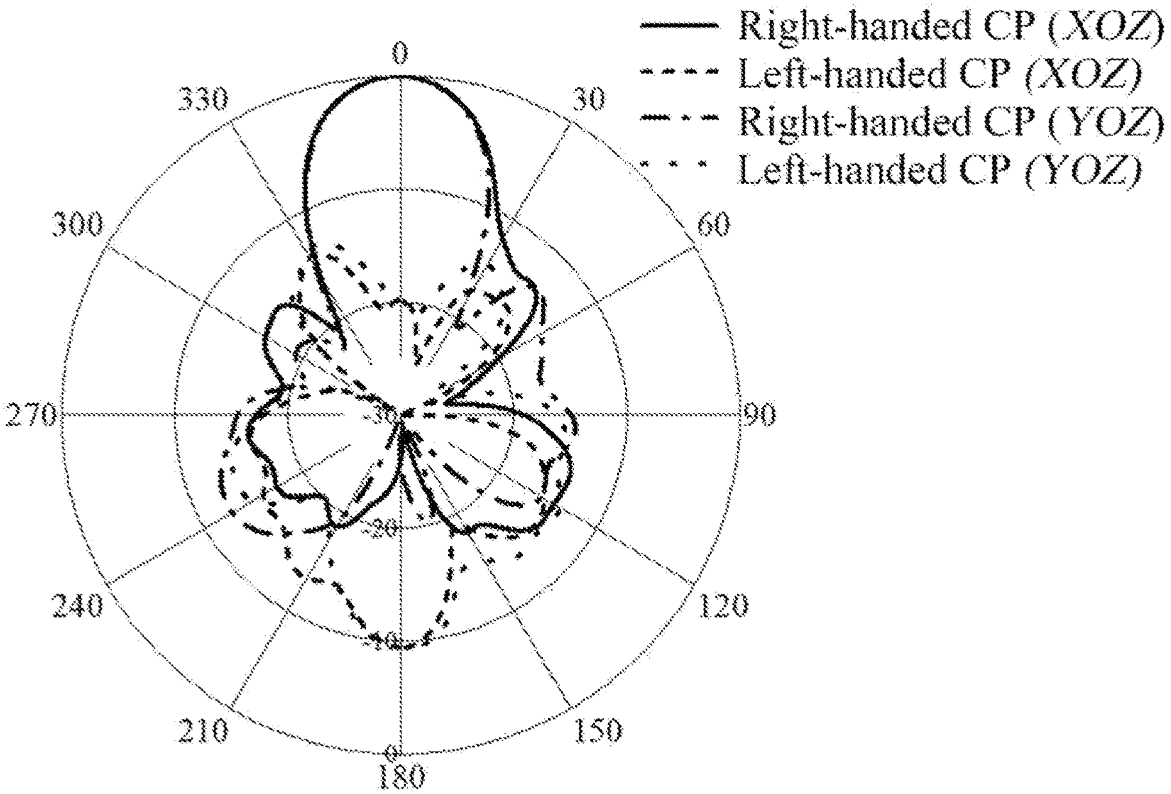
FIG. 12 is a normalized radiation pattern of a 2×2 antenna subarray according to the present disclosure at a frequency point of 35 GHz.

FIG. 12 is a normalized radiation pattern of a 2×2 antenna subarray at a frequency point of 35 GHz. As can be seen from FIG. 12 that the antenna radiates right-handed circularly polarized waves in a +z direction and shows significant unidirectional radiation characteristics. The left-handed circularly polarized wave is small relative to the right-handed circularly polarized wave.

The 2×2 antenna subarray provided by this embodiment has the following advantages:

Based on the antenna element in Embodiment 1, a 2×2 antenna subarray is designed by using a traditional one-to-four single-mode sequential-rotated feed network, with a structure shown in FIG. 8 and FIG. 9. The 2×2 antenna subarray is designed on a double-layer Rogers 5880 dielectric substrate, and the single-mode sequential-rotated feed network is located on the lower surface of the fourth dielectric substrate. Energy is coupled to each antenna element through four coupling slots. By optimizing the distance between adjacent antenna elements and structural parameters of the sequential-rotated feed network with HFSS electromagnetic simulation software, approximately equal power and 90-degree phase difference can be obtained, thus further improving the axial ratio (AR for short) bandwidth of the 2×2 antenna subarray.

Embodiment 3

It is provided a dual-mode array according to this embodiment. The dual-mode array is a 4×4 antenna array. The 4×4 antenna array includes a second sequential-rotated split ring structure, a second main feeder, and four single-mode arrays of Embodiment 2 arranged in a sequentially rotating manner. Rotation directions of the four single-mode arrays are the same as a rotation direction of a dual-mode sequential-rotated feed network.

The third dielectric substrates of the four single-mode arrays are a same dielectric substrate, and the fourth dielectric substrates of the four single-mode arrays are a same dielectric substrate.

In the traditional antenna array design based on sequential-rotated feed networks, the axial ratio bandwidth can be significantly enhanced when the antenna element is extended to a 2×2 antenna subarray, while the axial ratio bandwidth of 4×4 antenna array is almost no longer increased when the 2×2 antenna subarray is extended to a 4×4 antenna array. This is mainly because the traditional design of the circularly polarized antenna array based on sequential-rotated feed networks mainly focuses on designing the structure and shape of sequential-rotated split rings of the sequential-rotated feed networks, and the structure and diameter of the first sequential-rotated split ring of the 2×2 antenna subarray are the same as those of the second sequential-rotated split ring of the 4×4 antenna array, which can only produce a CP resonance point, resulting in limited increase of the axial ratio bandwidth. At present, so far, no researchers have designed structures of sequential-rotated split rings with different structures and diameters and used such structures in 4×4 and larger antenna arrays. In this embodiment, firstly, when the antenna elements form a 2×2 antenna subarray, a diameter of the first sequential-rotated split ring structure used for connecting the four antenna elements is R1, and the 2×2 antenna subarray can produce a CP resonance point at the moment. Since the sequential-rotated feed network has only one first sequential-rotated split ring structure with the diameter R1, the sequential-rotated feed network is called a single-mode sequential-rotated feed network. Then, when the 2×2 antenna subarray is further extended to a 4×4 antenna array, a diameter of the second sequential-rotated split ring structure for connecting the four 2×2 antenna subarrays is R2. At the moment, the 2×2 antenna subarray can be equivalent to an antenna element, and produced CP resonance points are different due to the fact that diameters R1 and R2 are different. Therefore, theoretically, another new CP resonant point can be obtained for the 4×4 antenna array. By optimizing the size of the diameter R2 and the structural parameters of the second sequential-rotated split ring structure, two CP resonant points (the two CP resonant points are produced by the sequential-rotated split ring structures with the diameters R1 and R2, respectively) can be combined to further extend the axial ratio bandwidth of the antenna array. Because the provided sequential-rotated feed network of the 4×4 antenna array has two sequential-rotated split ring structures (with diameters of R1 and R2, respectively), the sequential-rotated feed network is called a dual-mode sequential-rotated feed network.

Figure 13:
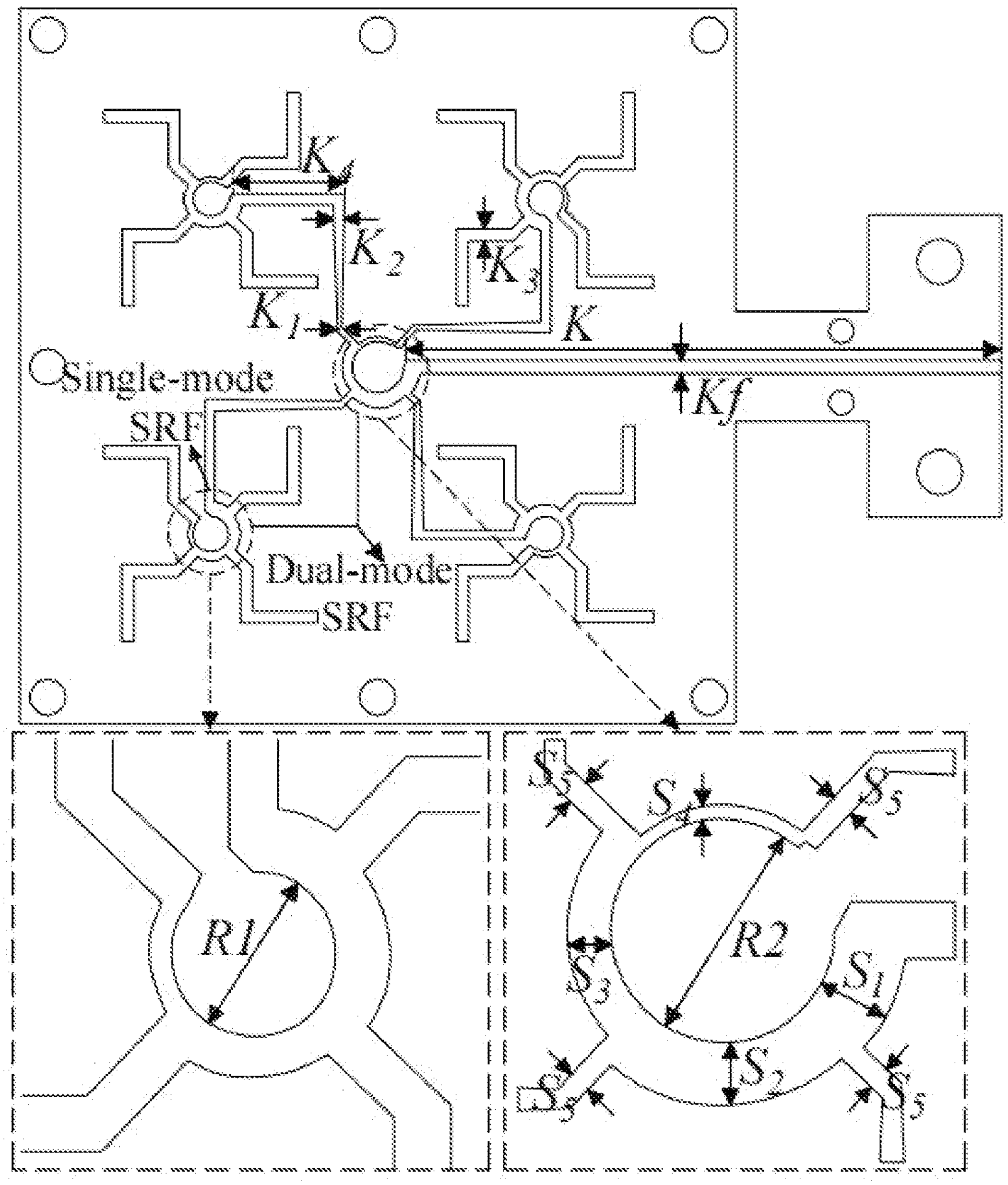
FIG. 13 is a structural diagram of a dual-mode sequential-rotated feed network according to the present disclosure.

As shown in FIG. 13, the dual-mode sequential-rotated feed network is a feed network consisting of four single-mode sequential-rotated feed networks, a second sequential-rotated split ring structure, and a second main feeder. The second sequential-rotated split ring structure is respectively connected to one end of the second main feeder and the other end of the first main feeder in each of the four single-mode sequential-rotated feed networks. The other end of the second main feeder is a microstrip feed port. A diameter of the first sequential-rotated split ring structure in the single-mode array is different from that of the second sequential-rotated split ring structure. A first arc segment, a second arc segment, a third arc segment and a fourth arc segment in the first sequential-rotated split ring structure in the single-mode array are different from a first arc segment, a second arc segment, a third arc segment and a fourth arc segment of the second sequential-rotated split ring structure in size.

The first main feeder is divided into three segments in sequence, the first segment has a width K1 of 0.2 mm, the second segment has a width K2 of 0.5 mm, a third segment has a width K3 of 0.55 mm and a length K4 of 5.09 mm. The second main feeder has a length K of 26.91 mm and a width Kf of 0.6 mm. The diameter R1 is equal to 1.6 mm, and the diameter R2 is equal to 2.34 mm. The second sequential-rotated split ring structure is sequentially divided into four arc segments, the distances between the inner rings and the outer rings of the arc segments are S1=0.75 mm, S2=0.66 mm, S3=0.46 mm, S4=0.15 mm, respectively, and an end connected to the second sequential-rotated split ring structure has a width S5 of 0.24 mm.

Figure 14:
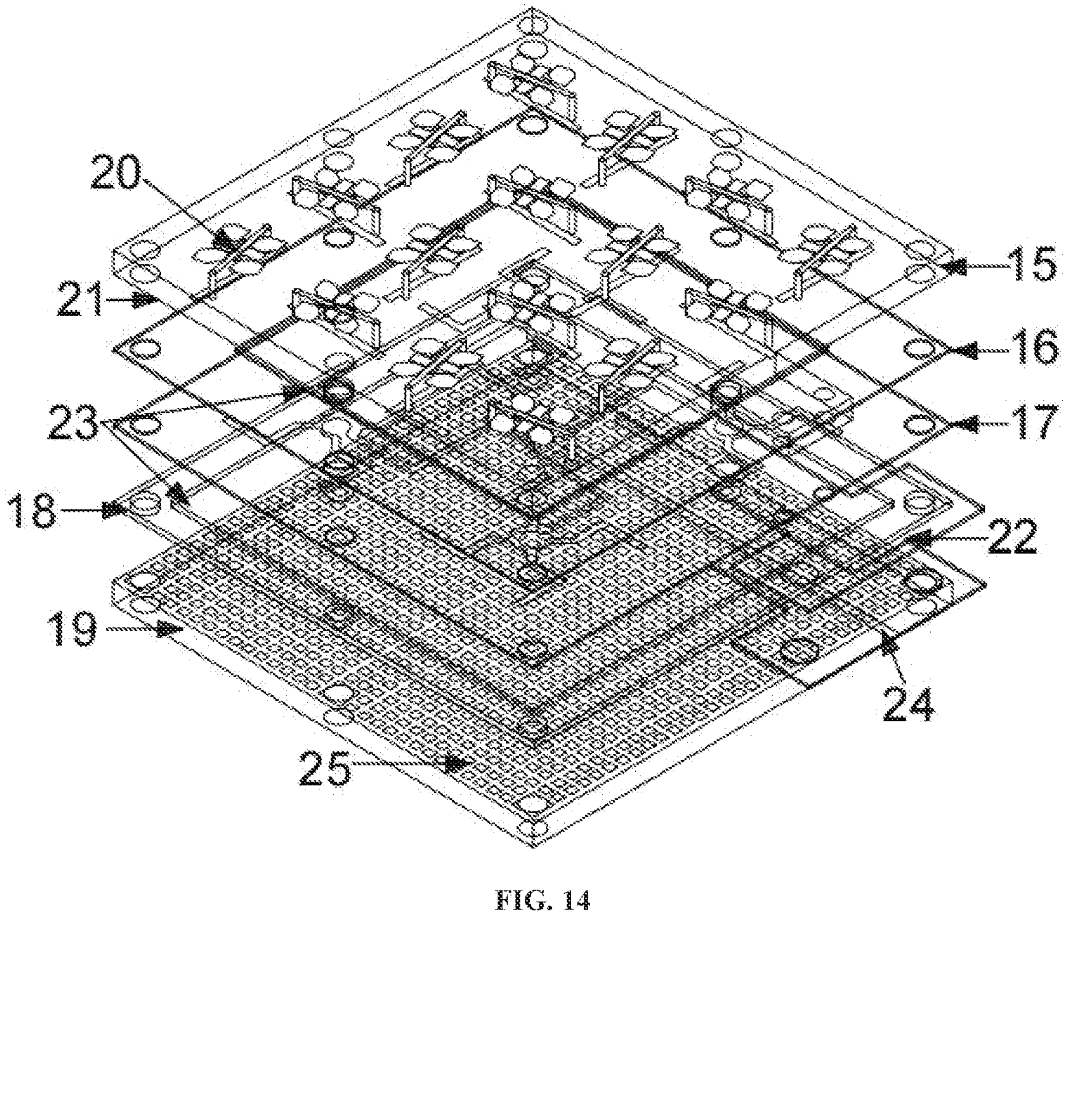
FIG. 14 is a structure schematic diagram of a 4×4 antenna array according to the present disclosure.

FIG. 14 is a structure schematic diagram of a 4×4 antenna array. As can be seen from FIG. 14 that the positions of various structures of the 4×4 antenna array and the relationship between the structures can be observed, specifically as follows:

The 4×4 antenna array includes a fifth dielectric substrate 15, a sixth dielectric substrate 16, a seventh dielectric substrate 17, an eighth dielectric substrate 18 and a ninth dielectric substrate 19 in sequence from top to bottom. The third dielectric substrates of the four single-mode arrays are a same dielectric substrate and are the fifth dielectric substrate 15. The fourth dielectric substrates of the four single-mode arrays are a same dielectric substrate and are the ninth dielectric substrate 19.

The fifth dielectric substrate 15 employs a Rogers 5880 dielectric substrate with a thickness of 1.575 mm, a width of 32.5 mm, a length of 32.5 mm, and a dielectric constant of 2.2. A loss tangent tan $\delta$ of the fifth dielectric substrate 15 is equal to 0.0009.

The sixth dielectric substrate 16 employs a Rogers 5880 dielectric substrate with a thickness of 0.127 mm, a width of 32.5 mm, a length of 32.5 mm, and a dielectric constant of 2.2. A loss tangent tan $\delta$ of the sixth dielectric substrate 16 is equal to 0.0009. In order to reduce the dielectric loss, the middle of the sixth dielectric substrate 16 is hollowed out, i.e., the middle of a planar dielectric substrate is hollowed out. A front end of the sixth dielectric substrate 16 has a protruded “T”-shaped structure designed for installing a radio frequency adapter, which has little effect on the overall performance and innovation.

The seventh dielectric substrate 17 employs a Rogers 5880 dielectric substrate with a thickness of 0.127 mm, a width of 32.5 mm, a length of 32.5 mm, and a dielectric constant of 2.2. A loss tangent tan $\delta$ of the seventh dielectric substrate 17 is equal to 0.0009. A front end of the seventh dielectric substrate 17 has a protruded “T”-shaped structure designed for installing the radio frequency adapter, which has little effect on the overall performance and innovation.

The eighth dielectric substrate 18 employs a Rogers 5880 dielectric substrate with a thickness of 0.381 mm, a width of 32.5 mm, a length of 32.5 mm, and a dielectric constant of 2.2. A loss tangent tan δ of the eighth dielectric substrate 18 is equal to 0.0009. In order to reduce the dielectric loss, the middle of the eighth dielectric substrate 18 is hollowed out, i.e., the middle of a planar dielectric substrate is hollowed out.

The ninth dielectric substrate 19 employs a Rogers 5880 dielectric substrate with a thickness of 1.575 mm, a width of 32.5 mm, a length of 32.5 mm, and a dielectric constant of 2.2. A loss tangent tan δ of the ninth dielectric substrate is equal to 0.0009.

The fifth dielectric substrate 15, the sixth dielectric substrate 16, the seventh dielectric substrate 17, the eighth dielectric substrate 18, and the ninth dielectric substrate 19 are next to each other.

The antenna element 20 is the antenna element structure in Embodiment 1, and a total of sixteen (4×4) antenna element structures is located in the fifth dielectric substrate 15. A first metal ground layer 21 is located on a lower surface of the fifth dielectric substrate 15 and is made of copper, on which sixteen (4×4) coupling slots are cut. A second metal ground layer 22 is located on an upper surface of the front end of the sixth dielectric substrate 16, and is co-grounded with the first metal ground layer 21 (the first metal layer 21 and the second metal layer 22 are closely attached), so as to achieve the grounding of the radio frequency adapter. A hollowed-out air layer 23 is a hollowed-out structure in the middle of each of the sixth dielectric substrate 16 and the eighth dielectric substrate 18. The dual-mode sequential-rotated feed network 24 is as shown in FIG. 13. An electromagnetic band gap structure (EBG for short) 25 for reducing backward radiation of the 4×4 antenna array is provided on the ninth dielectric substrate 19.

Figure 15:
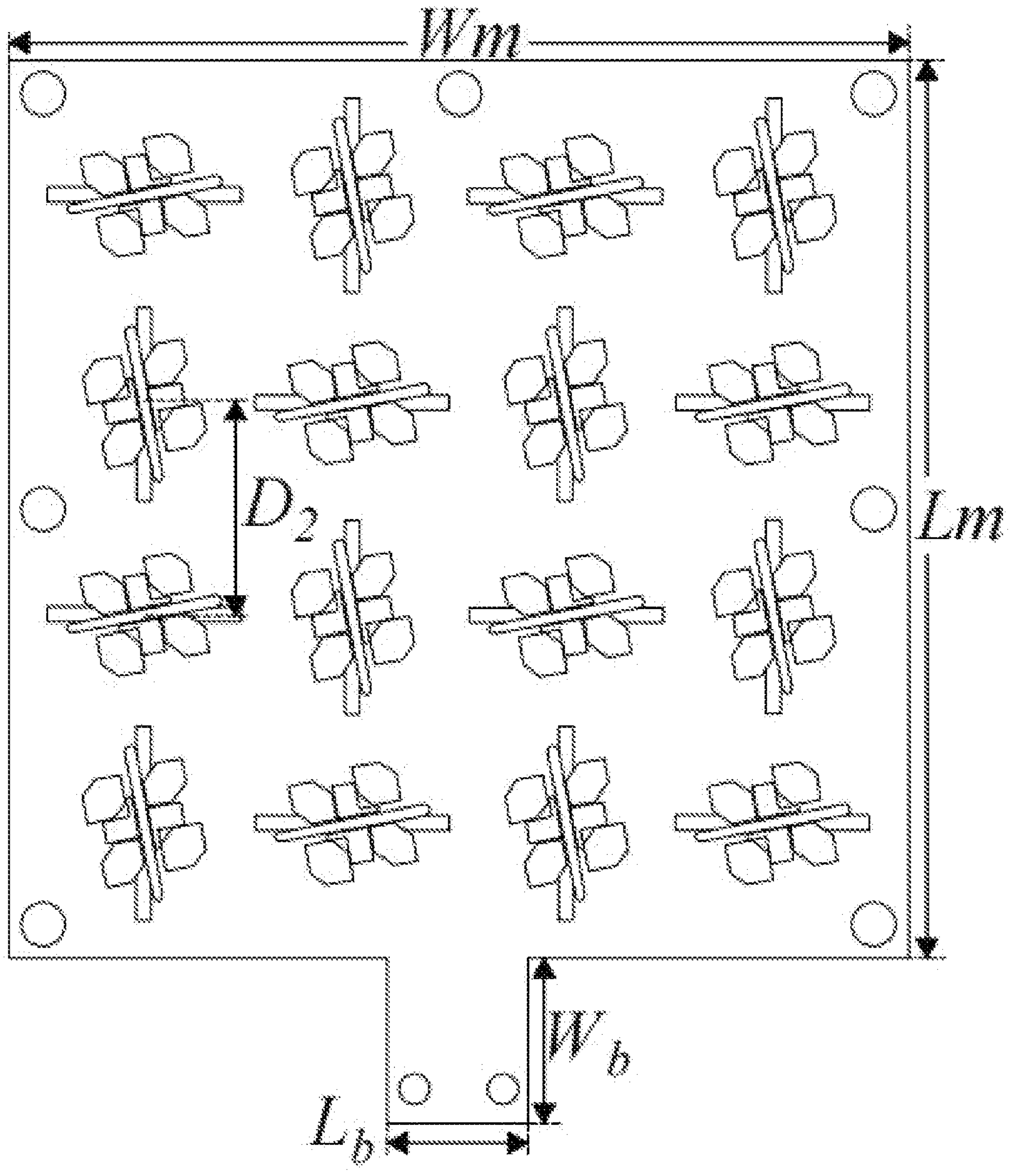
FIG. 15 is a structural parameter diagram of a radiation structure of a 4×4 antenna array according to the present disclosure.

FIG. 15 is a structural parameter diagram of a radiation structure of a 4×4 antenna array. As shown in FIG. 15, the sixth dielectric substrate has a width Wm of 32.5 mm, and a length Lm of 32.5 mm. In two adjacent antenna elements, a distance D2 between a center point of a metal strip in one antenna element and a center point of a metal strip in another antenna element is equal to 7.7 mm, the protruded part has a width Wb of 6.0 mm, and a length Lb of 5.0 mm. The radiation structure of the 4×4 antenna array is located on the upper surface of the fifth dielectric substrate.

Figure 16:
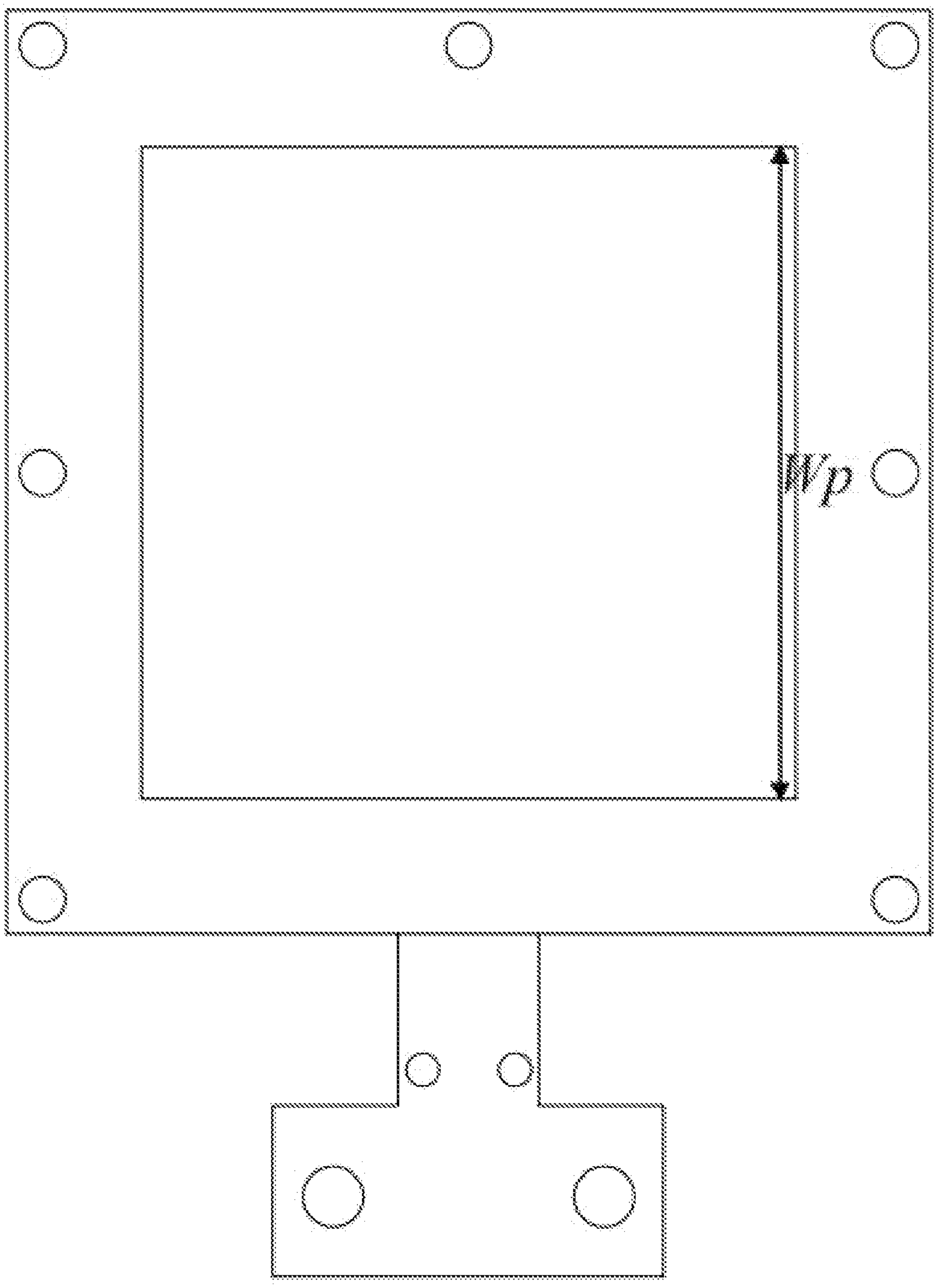
FIG. 16 is a plane structure diagram of a sixth dielectric substrate of a 4×4 antenna array according to the present disclosure.

FIG. 16 is a planar structure diagram of a sixth dielectric substrate of a 4×4 antenna array. As shown in FIG. 16, a middle hollowed-out area of the sixth dielectric substrate is an air layer with a side length Wp of 23.0 mm.

Figure 17:
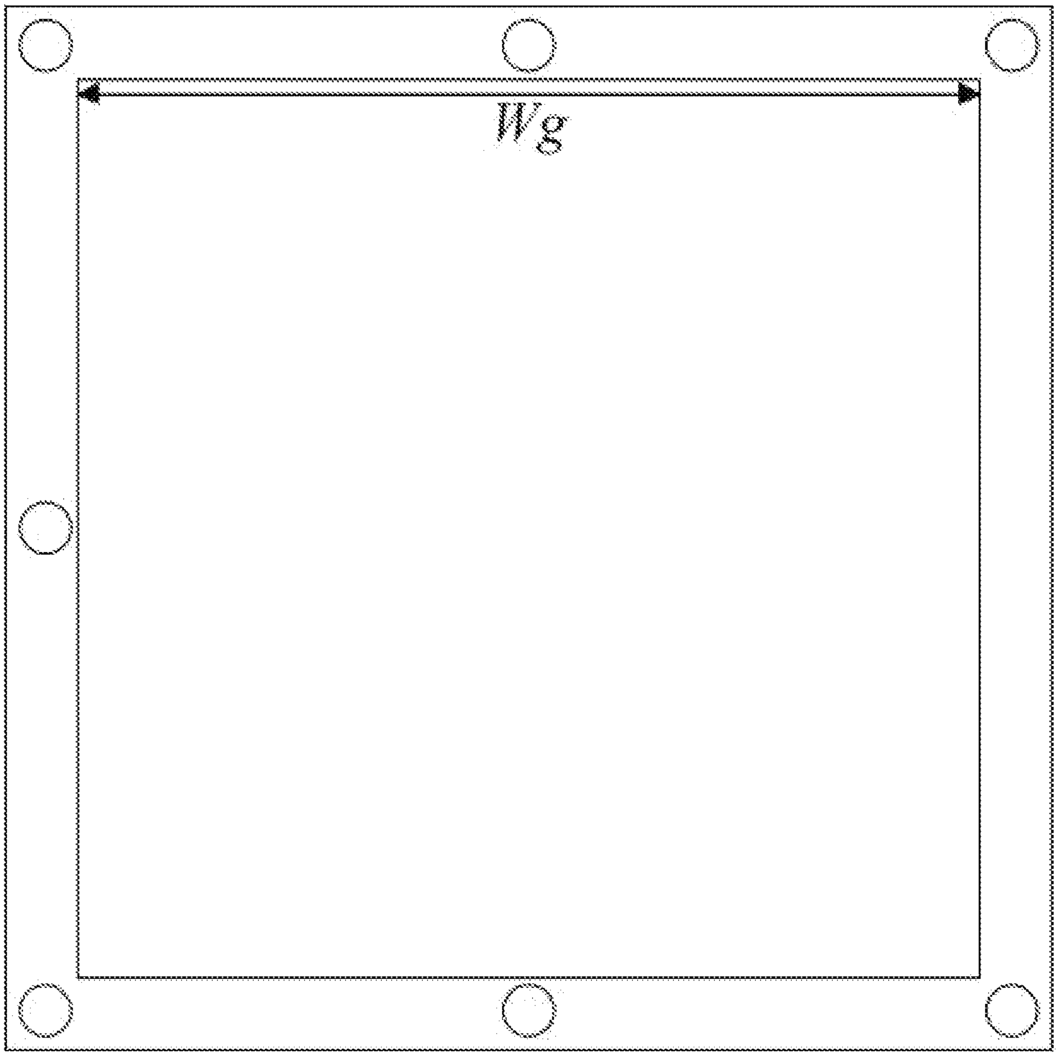
FIG. 17 is a plane structure diagram of an eighth dielectric substrate of a 4×4 antenna array according to the present disclosure.

FIG. 17 is a planar structure diagram of an eighth dielectric substrate of a 4×4 antenna array. As shown in FIG. 17, a middle hollowed-out area of the eighth dielectric substrate is an air layer with a side length Wg of 28.0 mm.

Figure 18:
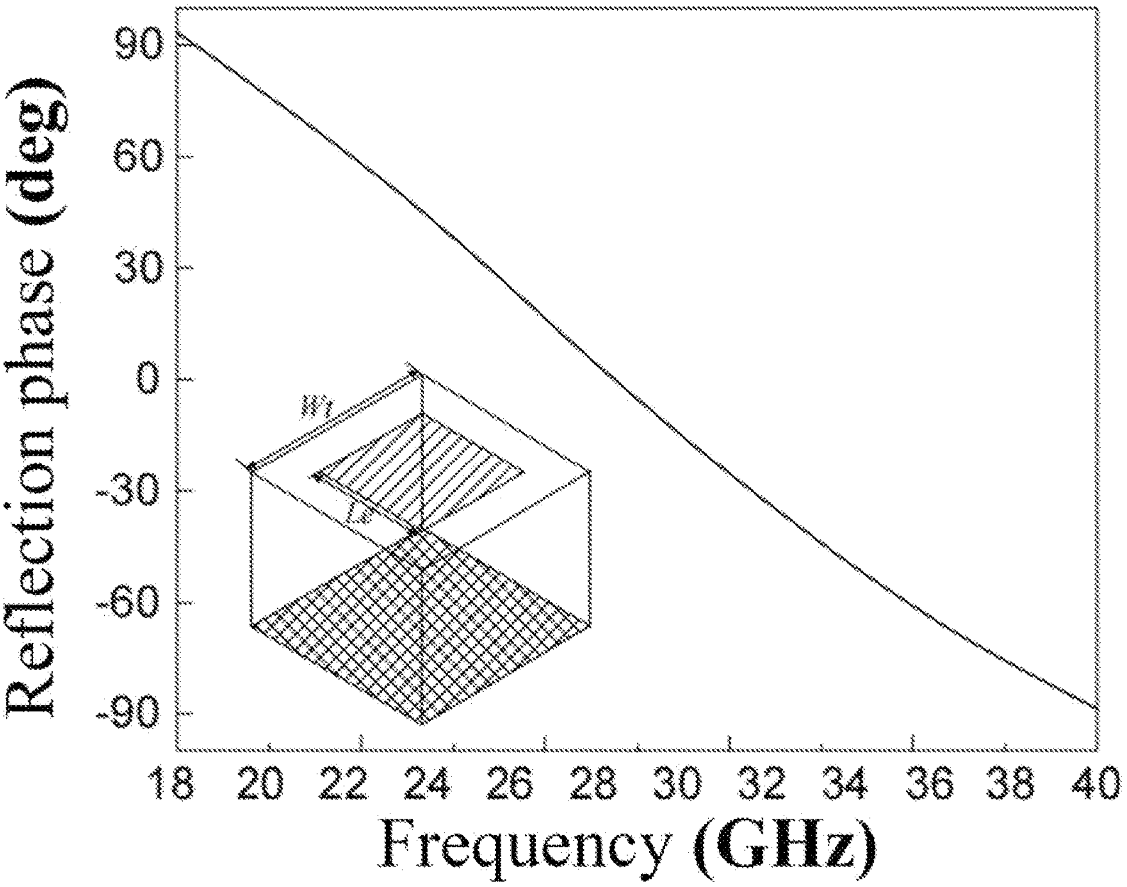
FIG. 18 is a diagram illustrating EBG parameters and simulated reflection phase results in a 4×4 antenna array according to the present disclosure.

FIG. 18 is a diagram illustrating EBG parameters and simulated reflection phase results in a 4×4 antenna array. As shown in FIG. 18, the EBG has an outer edge Wt of 1.0 mm, and an inner edge Le of 0.6 mm, the simulated −90-degree to 90-degree reflection phase bandwidth is about 18.4 GHz to 40.0 GHz, and in-phase reflection can be realized within this bandwidth range.

Figure 19:
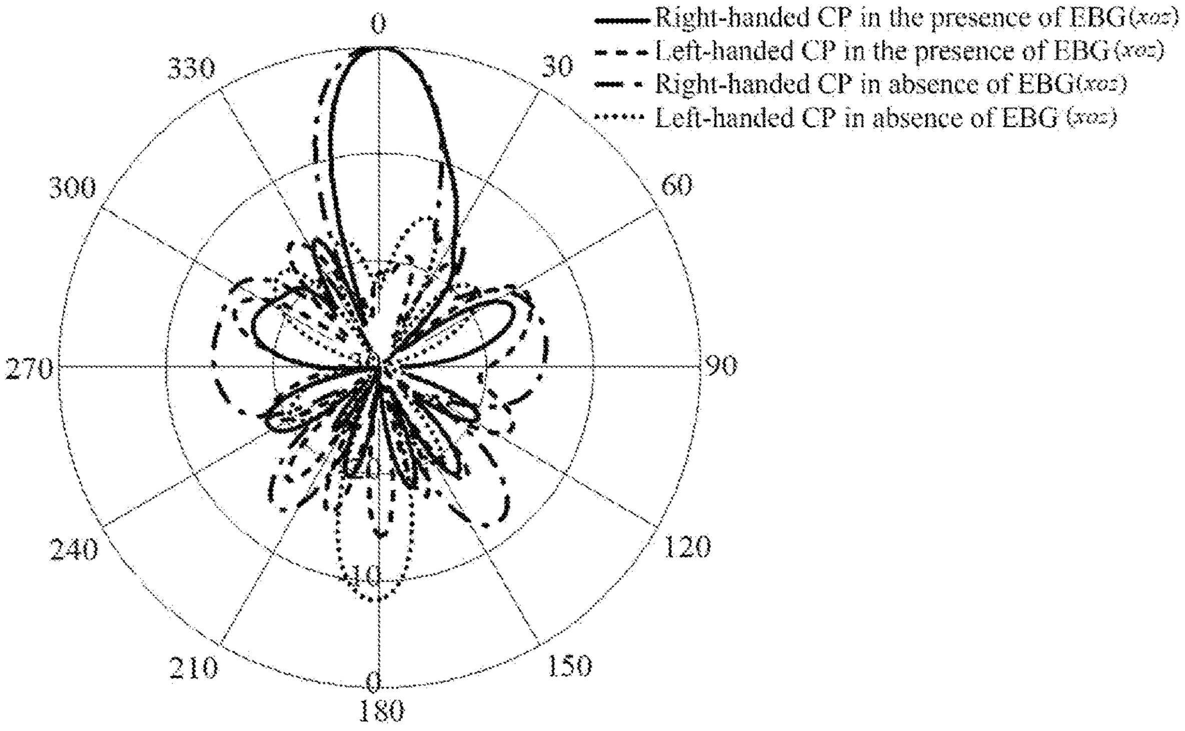
FIG. 19 is a normalized radiation pattern of a 4×4 antenna array according to the present disclosure with or without EBG in a simulated xoz plane at a frequency point of 29 GHz.

FIG. 19 is a normalized radiation pattern of a 4×4 antenna array with or without EBG in a simulated xoz plane at a frequency point of 29 GHz. As can be seen from FIG. 19 that compared with the radiation pattern of the antenna without EBG, a back lobe of the radiation pattern of the antenna with EBG is significantly smaller and has a higher front-back ratio.

Figure 20:
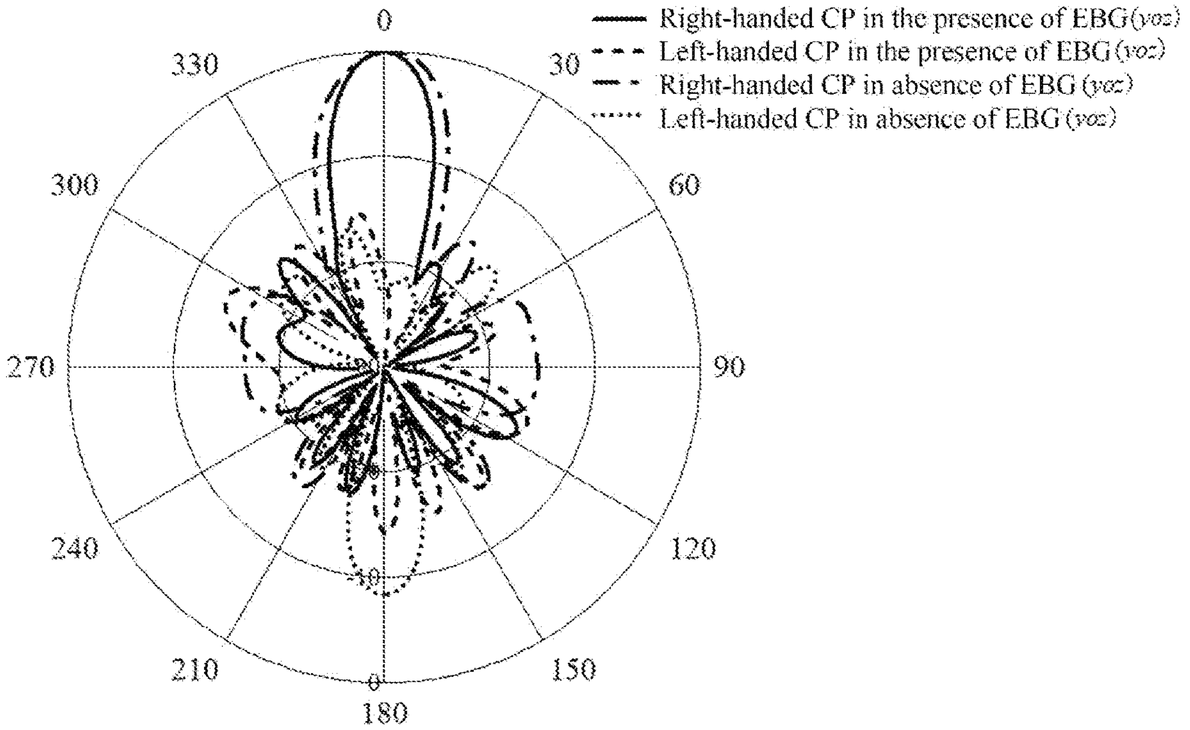
FIG. 20 is a normalized radiation pattern of a 4×4 antenna array according to the present disclosure with or without EBG in a simulated yoz plane at a frequency point of 29 GHz.

FIG. 20 is a normalized radiation pattern of a 4×4 antenna array with or without EBG in a simulated yoz plane at a frequency point of 29 GHz. As can be seen from FIG. 20 that compared with the radiation pattern of the antenna without EBG, a back lobe of the radiation pattern of the antenna with EBG is significantly smaller and has a higher front-back ratio.

Figure 21:
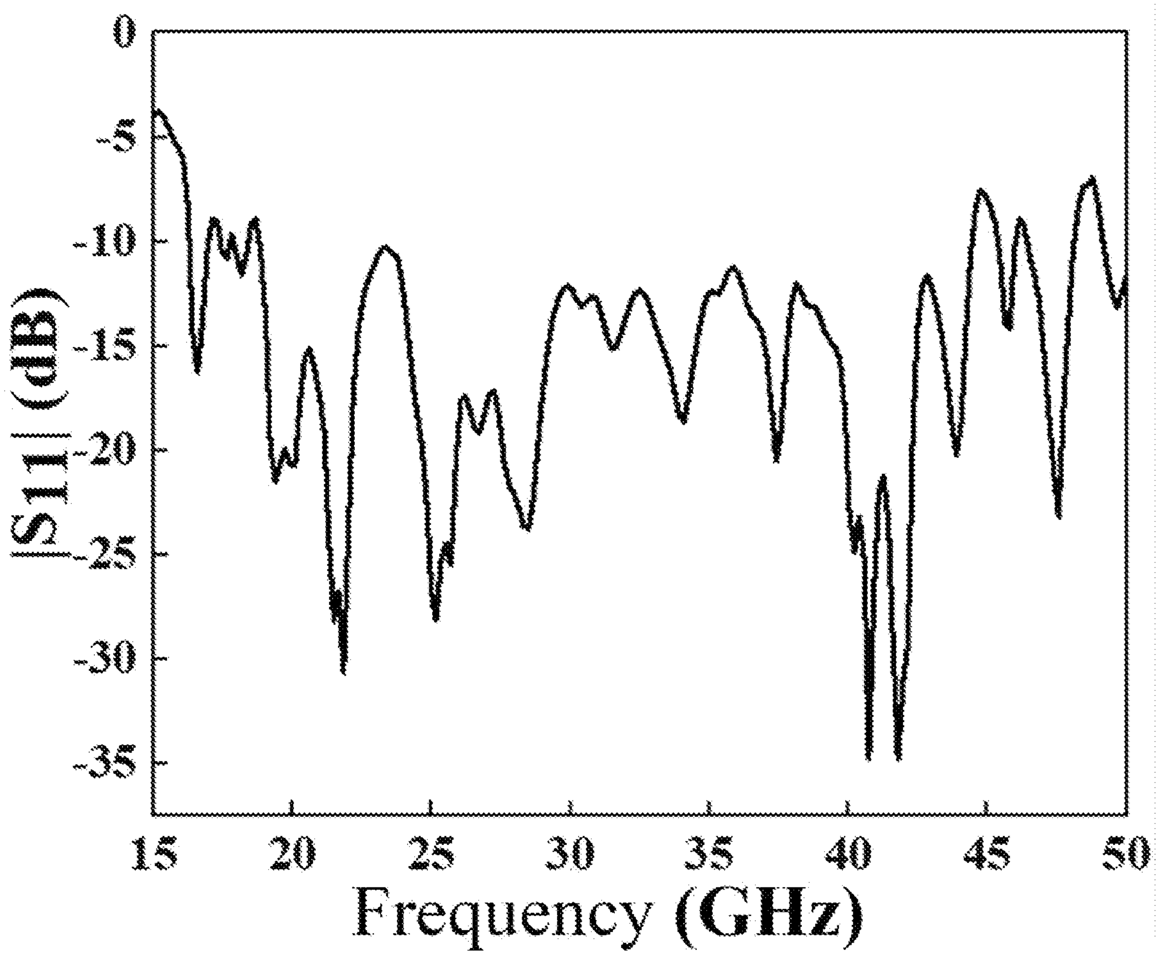
FIG. 21 is a diagram illustrating simulated S11 results of a 4×4 antenna array according to the present disclosure.

FIG. 21 is a diagram illustrating simulated S1 results of a 4×4 antenna array. As can be seen from FIG. 21, the −10 dB S11 bandwidth of the 4×4 antenna array is 81.2% (from 18.8 GHz to 44.5 GHz).

Figure 22:
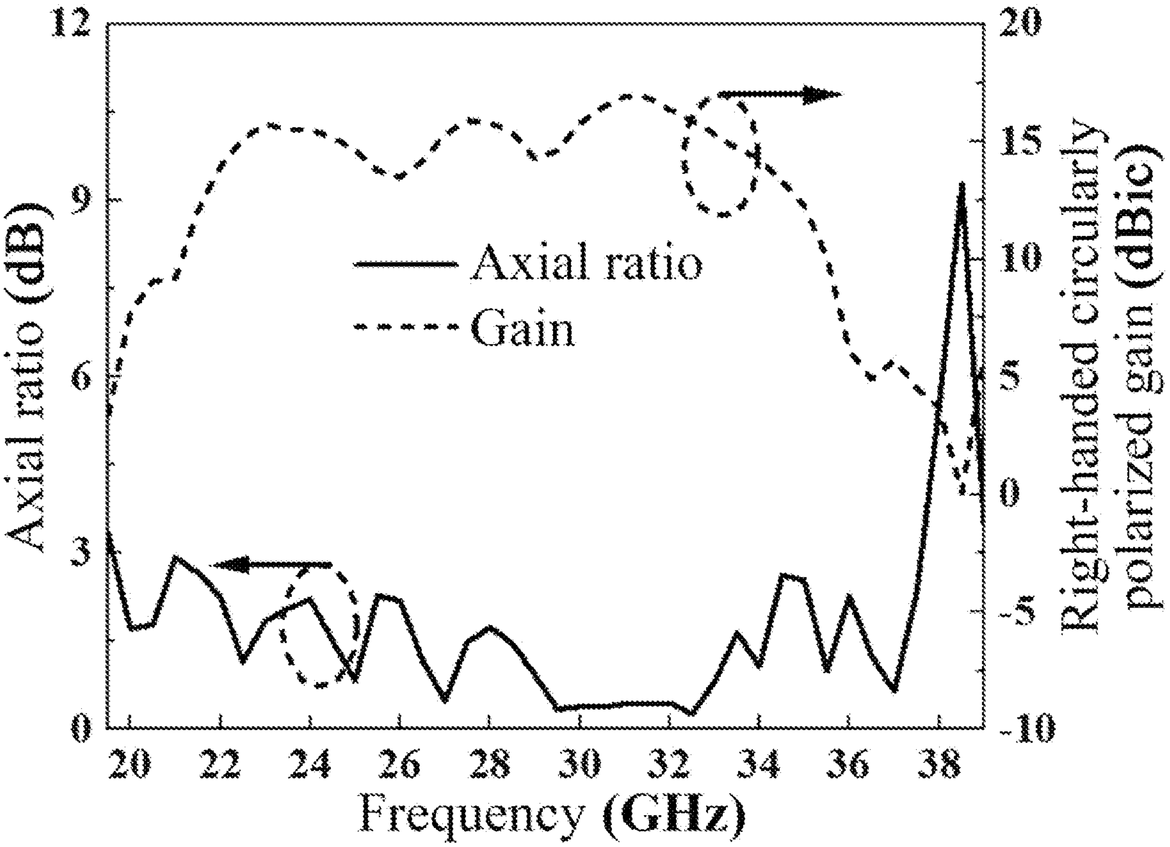
FIG. 22 is a diagram illustrating simulated axial ratio and gain results of a 4×4 antenna array according to the present disclosure.

FIG. 22 is a diagram illustrating simulation axial ratio and gain results of a 4×4 antenna array. As can be seen from FIG. 22, the −10 dB S11 bandwidth of the 4×4 antenna array is 62.9% (from 19.6 GHz to 37.6 GHz), and a peak right-handed gain is 16.9 dBic. Compared with the 2×2 antenna subarray, the 3 dB-axial ratio bandwidth is further increased by 14.6% (when the traditional single-mode sequential-rotated feed antenna array is extended from 2×2 antenna subarray to 4×4 antenna array, the axial ratio bandwidth is almost no longer increased). Compared with the antenna element, the 3 dB-axial ratio bandwidth of the 4×4 antenna array is increased by 39.7%.

Figure 23:
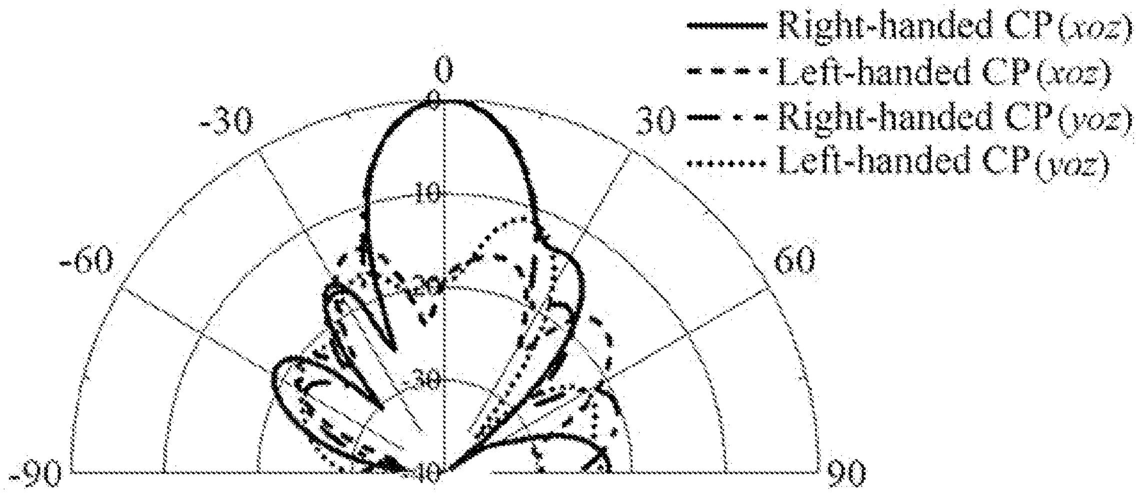
FIG. 23 is a normalized radiation pattern of a 4×4 antenna array according to the present disclosure at a frequency point of 23 GHz.

FIG. 23 is a normalized radiation pattern of a 4×4 antenna array at a frequency point of 23 GHz. As can be seen from FIG. 23 that the antenna radiates right-handed circularly polarized waves in a +z direction and shows significant unidirectional radiation characteristics. The left-handed circularly polarized wave is small relative to the right-handed circularly polarized wave.

Figure 24:
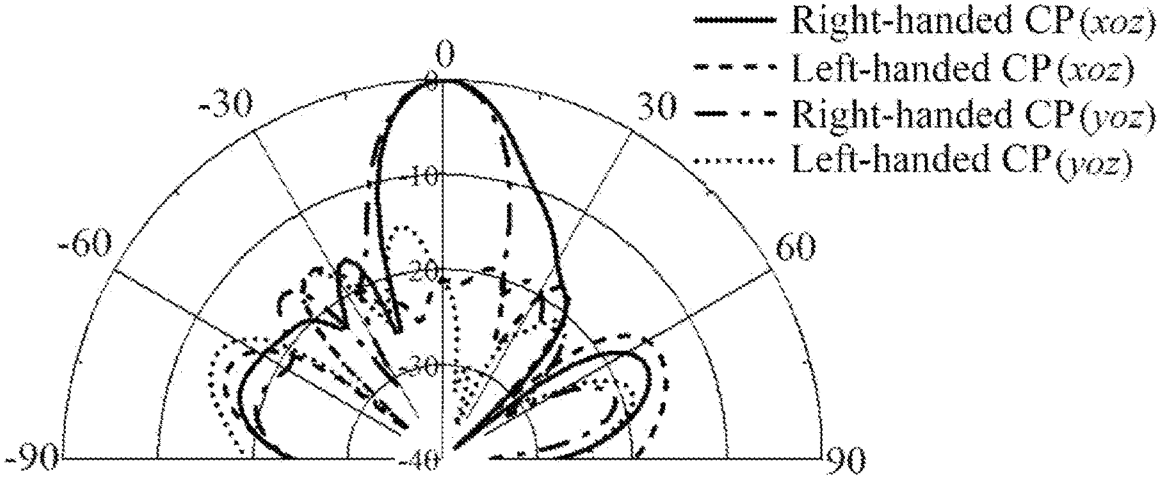
FIG. 24 is a normalized radiation pattern of a 4×4 antenna array according to the present disclosure at a frequency point of 28 GHz.

FIG. 24 is a normalized radiation pattern of a 4×4 antenna array at a frequency point of 28 GHz. As can be seen from FIG. 24 that the antenna radiates right-handed circularly polarized waves in a +z direction and shows significant unidirectional radiation characteristics. The left-handed circularly polarized wave is small relative to the right-handed circularly polarized wave.

Figure 25:
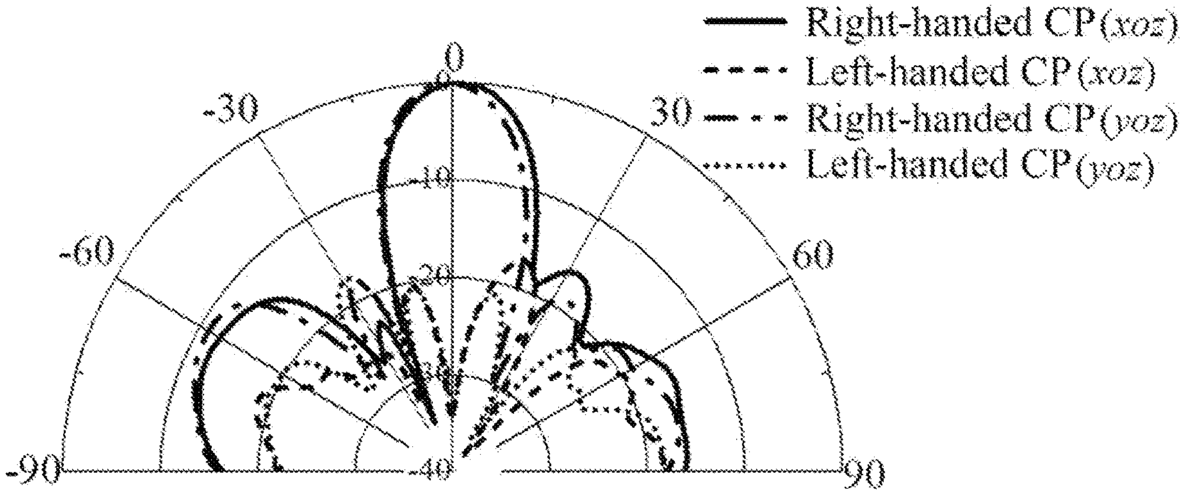
FIG. 25 is a normalized radiation pattern of a 4×4 antenna array according to the present disclosure at a frequency point of 33 GHz.

FIG. 25 is a normalized radiation pattern of a 4×4 antenna array at the frequency point of 33 GHz. As can be seen from FIG. 25 that the antenna radiates right-handed circularly polarized waves in a +z direction and shows significant unidirectional radiation characteristics. The left-handed circularly polarized wave is small relative to the right-handed circularly polarized wave.

It is provided a broadband millimeter wave circularly polarized antenna element (i.e., a broadband orthogonal magnetic dipole circularly polarized antenna element), a single-mode array (i.e., a 2×2 orthogonal magnetic dipole circularly polarized antenna subarray), and a dual-mode array (i.e., a 4×4 orthogonal magnetic dipole circularly polarized antenna array). The broadband orthogonal magnetic dipole antenna element includes a pair of orthogonal equivalent magnetic dipoles (for forming circularly polarized radiation), L-shaped parasitic patches and hexagonal parasitic patches (for enhancing 3-dB axial ratio bandwidth (i.e., circularly polarized bandwidth)), a first dielectric substrate, and a second dielectric substrate. The 2×2 orthogonal magnetic dipole circularly polarized antenna subarray includes a single-mode sequential-rotated feed network, four antenna elements, a third dielectric substrate, and a fourth dielectric substrate. The 4×4 orthogonal magnetic dipole circularly polarized antenna array includes a dual-mode sequential-rotated feed network, sixteen antenna elements, an electromagnetic band gap (EBG) structure, a fifth dielectric substrate, a sixth dielectric substrate, a seventh dielectric substrate, an eighth dielectric substrate, and a ninth dielectric substrate. The L-shaped parasitic patch and the hexagonal parasitic patch are used to increase the 3-dB axial ratio bandwidth of the orthogonal magnetic dipole antenna element, and the dual-mode sequential-rotated feed network is further used to greatly increase the 3-dB axial ratio bandwidth of the 4×4 antenna array (the bandwidth increase range is almost twice that of the traditional sequential-rotated feed network), and the planar array also has the advantages of simple structure, convenient processing, manufacturing and integration, etc. The specific advantages are as follows.

(1) The AR bandwidth of the antenna element is further enhanced by using the L-shaped parasitic patches and hexagonal parasitic patches.

(2) A novel dual-mode sequential-rotated feed network is proposed for the first time, and a 4×4 antenna array is designed based on the dual-mode sequential-rotated feed network, which solves the problem that the 3-dB axial ratio bandwidth from 2×2 antenna subarray to 4×4 antenna array is almost no longer increased in the current antenna array design based on the sequential-rotated feed network. Simulation results show that the dual-mode sequential-rotated feed network can significantly improve the 3-dB axial ratio bandwidth of the 2×2 antenna subarray and the 4×4 antenna array, and has wider 3-dB axial ratio bandwidth. When the antenna element is extended to a 2×2 antenna subarray, the 3-dB axial ratio bandwidth can be increased by 25.1%. When the 2×2 antenna subarray is extended to a 4×4 antenna array, the 3-dB axis specific bandwidth can be increased by 14.6% again. Finally, the simulation results show that the impedance and 3-dB axial ratio bandwidth of the 4×4 antenna array reach 81.2% (from 18.8 GHz to 44.5 GHz) and 62.9% (from 19.6 GHz to 37.6 GHz), respectively. Compared with the antenna element, the 3 dB-axial ratio bandwidth of the 4×4 antenna array is increased by 39.7% (which is almost twice that of the 3-dB axial ratio bandwidth enhanced by the traditional single-mode sequential-rotated feed network).

(3) An EBG structure is introduced into the 4×4 antenna array, which reduces the back radiation of the array and improves the front-back ratio (FBR) and gain. In order to reduce dielectric loss, middle portions of the sixth dielectric substrate and the eighth dielectric substrate are hollowed out.

(4) There are some difficulties in the design and implementation of ultra-broadband circularly polarized millimeter wave antenna arrays. Designing the circularly polarized millimeter wave antenna array by using the proposed dual-mode sequential-rotated feed network can easily achieve ultra-broadband radiation and can be compatible with various types of antenna elements like other traditional sequential-rotated feed networks, which provides a simple method for achieving the ultra-broadband circularly polarized antenna array. In addition, the dual-mode sequential-rotated feed network can be extended to a multi-mode sequential-rotated feed network, which is expected to achieve higher 3-dB axial ratio bandwidth enhancement. It can be further designed, such as using a substrate integrated waveguide structure to reduce the use of dielectric substrate, thus further improving the gain.

Embodiments in this specification are described in a progressive manner, each embodiment focuses on differences from other embodiments, and the same and similar parts between the embodiments can be referred to each other.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A broadband millimeter wave circularly polarized antenna element, comprising: a first dielectric substrate, a second dielectric substrate, and a metal ground layer located between the first dielectric substrate and the second dielectric substrate;

wherein a microstrip feeder is arranged on a lower surface of the second dielectric substrate; a coupling slot is etched on the metal ground layer, two metallized vias are provided on the first dielectric substrate, and a metal strip is tiled on an upper surface of the first dielectric substrate, the two metallized vias are located at outer edges of both sides of the coupling slot and are in contact with the coupling slot, one end of the metal strip is in contact with one of the metallized vias, the other end of the metal strip is in contact with another metallized via, thus making the coupling slot equivalent to one magnetic dipole, and the two metallized vias and the metal strip equivalent to another magnetic dipole as a whole;

two L-shaped parasitic patches are tiled on the first dielectric substrate, and the two L-shaped parasitic patches are located on both sides of the metal strip and are rotationally symmetrical about a center point of the upper surface of the first dielectric substrate;

wherein four hexagonal parasitic patches are also tiled on the first dielectric substrate, and the four hexagonal parasitic patches are located on both sides of the metal strip and are rotationally symmetrical about the center point of the upper surface of the first dielectric substrate.

2. The broadband millimeter wave circularly polarized antenna element according to claim 1, wherein a first hexagonal parasitic patch, a first L-shaped parasitic patch and a second hexagonal parasitic patch are tiled in sequence on one outer side of the metal strip; and a third hexagonal parasitic patch, a second L-shaped parasitic patch and a fourth hexagonal parasitic patch are tiled in sequence on the other outer side of the metal strip.

3. The broadband millimeter wave circularly polarized antenna element according to claim 1, wherein one of the metallized vias is located at an outer edge of a long side of the coupling slot to make contact with a long side of the coupling slot, and is close to a wide side of the coupling slot; another metallized via is located at an outer edge of another long side of the coupling slot to make contact with another long side of the coupling slot, and is close to another wide side of the coupling slot.

4. A single-mode array, wherein the single-mode array is a 2×2 antenna subarray, the 2×2 antenna subarray comprises a first sequential-rotated split ring structure, a first main feeder, and four antenna elements arranged in a sequentially rotating manner; the antenna elements each are a broadband millimeter wave circularly polarized antenna element of claim 1;

rotation directions of the four antenna elements are the same as a rotation direction of a single-mode sequential-rotated feed network; the single-mode sequential-rotated feed network is a feed network consisting of microstrip feeders of the four antenna elements, the first sequential-rotated split ring structure, and the first main feeder; wherein the first sequential-rotated split ring structure is respectively connected to one end of the microstrip feeder of each of the four antenna elements and one end of the first main feeder.

5. The single-mode array according to claim 4, wherein first dielectric substrates of the four antenna elements are a same dielectric substrate, and second dielectric substrates of the four antenna elements are a same dielectric substrate; the other end of the microstrip feeder extends to a lower surface of the second dielectric substrate of the antenna element, and the other end of the first main feeder is a microstrip feed port.

6. A dual-mode array, wherein the dual-mode array is a 4×4 antenna array; the 4×4 antenna array comprises a second sequential-rotated split ring structure, a second main feeder, and four single-mode arrays of claim 4 arranged in a sequentially rotating manner;

rotation directions of the four single-mode arrays are the same as a rotation direction of a dual-mode sequential-rotated feed network; the dual-mode sequential-rotated feed network is a feed network consisting of four single-mode sequential-rotated feed networks, the second sequential-rotated split ring structure and the second main feeder; wherein the second sequential-rotated split ring structure is respectively connected to one end of the second main feeder and the other end of the first main feeder of each of the four single-mode sequential-rotated feed networks;

a diameter of the first sequential-rotated split ring structure in the single-mode array is different from that of the second sequential-rotated split ring structure.

7. The dual-mode array according to claim 6, wherein the dual-mode array comprises a fifth dielectric substrate, a sixth dielectric substrate, a seventh dielectric substrate, an eighth dielectric substrate and a ninth dielectric substrate in sequence from top to bottom;

third dielectric substrates of the four single-mode arrays are a same dielectric substrate and are the fifth dielectric substrate; and fourth dielectric substrates of the four single-mode arrays are a same dielectric substrate and are the ninth dielectric substrate.

8. The dual-mode array according to claim 7, wherein front ends of the sixth dielectric substrate and the seventh dielectric substrate each are a protruded T-shaped structure; and the T-shaped structure is used for installing a radio frequency adapter.

9. The dual-mode array according to claim 7, wherein the sixth dielectric substrate and the eighth dielectric substrate each are a dielectric substrate obtained after hollowing out the middle of a planar dielectric substrate; and an electromagnetic band gap structure is also arranged on the ninth dielectric substrate.

* * * * *